United States Patent
Patterson et al.

(10) Patent No.: US 12,554,864 B2
(45) Date of Patent: Feb. 17, 2026

(54) SYSTEMS AND METHODS FOR DYNAMICALLY DETERMINING ASSESSMENT RESULTS

(71) Applicant: Sysnet North America, Inc., Chicago, IL (US)

(72) Inventors: Thomas Joseph Patterson, Sumter, SC (US); Tyler Leslie Owen, Mechanicsville, VA (US); James Kevin Pierce, Raleigh, NC (US)

(73) Assignee: Sysnet North America, Inc., Chicago, IL (US)

( * ) Notice: Subject to any disclaimer, the term of this patent is extended or adjusted under 35 U.S.C. 154(b) by 0 days.

(21) Appl. No.: 19/022,847

(22) Filed: Jan. 15, 2025

(65) Prior Publication Data

US 2025/0252191 A1 Aug. 7, 2025

Related U.S. Application Data

(60) Provisional application No. 63/550,312, filed on Feb. 6, 2024.

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,536,340 B2 | 5/2009 | Dheer et al. | |
| 7,975,286 B1 | 7/2011 | Fickey et al. | |
| 9,392,012 B2 | 7/2016 | Becker et al. | |
| 11,611,590 B1 * | 3/2023 | Amar | G06Q 10/105 |
| 2004/0073445 A1 | 4/2004 | Mellinger et al. | |
| 2014/0223555 A1 * | 8/2014 | Sanz Hernando | H04L 63/1416 726/22 |
| 2017/0324768 A1 * | 11/2017 | Crabtree | H04L 63/1433 |
| 2018/0270265 A1 * | 9/2018 | Sage | H04L 63/1425 |

(Continued)

FOREIGN PATENT DOCUMENTS

WO 2019156786 A1 8/2019

*Primary Examiner* — Fatoumata Traore
(74) *Attorney, Agent, or Firm* — Bryan L. Baysinger; Thomas R. Parker, II; Maynard Nexsen PC

(57) ABSTRACT

Various methods, systems, and computer program products are provided for determining and classifying assessment results. The method may include determining one or more entity assessments to be completed for an account. The method may also include receiving one or more security data packets used to simulate each of the one or more entity assessments. The one or more security data packets are received from a security database. The method may further include receiving one or more compliance data packets used to simulate each of the one or more entity assessments. The one or more compliance data packets are received from a compliance database. A method may further include determining or classifying an entity assessment determination for each of the one or more entity assessments. The method may also include determining or calculating a risk score for the account based on the entity assessment determination for each of the one or more entity assessments.

20 Claims, 12 Drawing Sheets

(56) References Cited

U.S. PATENT DOCUMENTS

| | | |
|---|---|---|
| 2020/0273046 A1* | 8/2020 | Biswas .................... G06N 3/08 |
| 2021/0075814 A1 | 3/2021 | Bulut et al. |
| 2021/0168175 A1 | 6/2021 | Crabtree et al. |
| 2021/0409437 A1 | 12/2021 | Roach et al. |
| 2022/0060499 A1 | 2/2022 | Huda |
| 2025/0055876 A1* | 2/2025 | Murray ............... H04L 63/0414 |

* cited by examiner

Dashboard · Assessment Overview

Overview    Executive Report    Manage Assessments

ACME Automobile Center —705

Score: A-90.9%    ✓17 Passed Checks    ✗5 Failed Checks —710

◎ View report                                              🔍 Find another Assessment    ⚡ Restart

—715

| Date | Parent Category | Service Category | Status | Score/Weight | Action |
|---|---|---|---|---|---|
| ∧ 18 Jan 2024 | Vulnerability MGT | Web App. Security (5 Checks) | Done | 8 out of 10 | ... |
| | | Total PCI Pass Failures | Passed | | ... |
| | | Total PCI Critical Vulnerabiliti... | Passed | | ... |
| | | Total PCI High Vulnerabilities | Failed | | ... |
| | | Total PCI Medium Vulnerabil... | Passed | | ... |
| | | Total PCI Low Vulnerabilities | Passed | | ... |
| ∨ 17 Jan 2024 | Vulnerability MGT | Network Security (9 Checks) | Done | 7 out of 10% | ... |
| ∨ 16 Jan 2024 | Vulnerability MGT | Dark Web Findings (1 Check) | Done | 4 out of 5% | ... |
| ∨ 15 Jan 2024 | Vulnerability MGT | WRM (1 Check) | Done | 7 out of 10% | ... |
| ∨ 15 Jan 2024 | MSS | DNS Security (2 Checks) | Done | 14 out of 15% | ... |
| ∨ 15 Jan 2024 | Endpoint Security | Endpoints (4 Checks) | Done | 14 out of 15% | ... |

Assessment Score Sheet

90.9
Grade A

Great Job!
Grade "A" means You are doing better than most organizations. Your security posture is good and at a very low risk. However, there are areas to improve.

Your performance across the board

| | |
|---|---|
| Website Security | 100% |
| Custom Checks | 100% |
| Endpoint Security | 99% |
| Vulnerability Mgt | 88% |
| Regulations | 76% |

| Vulnerability Management | Website Security | Endpoint Security | Regulations |
|---|---|---|---|
| 31/35 | 15/15 | 14.9/15 | 23/30 |

Custom Checks 5/5

Boost your score by taking action today!
Explore our recommended actions tailored to improve your current score.

+9 POTENTIAL POINTS

Recommended actions for you

Subscribe to Managed Security Testing Services
Leverage the power of Managed Security Testing Services.
[Get Started]

Install a Next-Gen Antivirus
Get world class protection by installing a Next generation Antivirus.
[Get Started]

Speak with a professional
Connect with one of our representitives to get more insights and advise.
[Connect]

⇩ Download score sheet

FIG.8

ASSESSMENT CATEGORY INDEPTH

1. Vulnerability Management

905 — Your score
31/35

Vulnerability management is a proactive approach to identifying, assessing, prioritizing, and mitigating vulnerabilities in computer systems, software, and networks. The goal is to reduce the potential for security breaches by addressing weaknesses in the organization's IT infrastructure before they can be exploited by malicious actors.

Vulnerability Management Breakdown

910 — Your score
8/10

Website Application Security
A scan made up of 5 checks targeting your web application security

- ✓ PCI pass failures
- ✓ PCI Critical vulnerabilities
- ✓ PCI High vulnerabilities
- ✓ PCI Med. vulnerabilities
- ✗ PCI Low vulnerabilities
- ✗ SSL 915 — Your score
8/10

Network Security
A scan made up of 8 checks targeting your web application security

- ✓ IVS Critical vulnerabilities
- ✓ IVS High vulnerabilities
- ✓ IVS Medium vulnerabilities
- ✗ IVS Low vulnerabilities
- ✓ EVS Critical vulnerabilities
- ✓ EVS High vulnerabilities
- ✓ EVS Medium vulnerabilities
- ✗ EVS Low vulnerabilities 920 — Your score
2/4

Dark Web Findings
A scan to get all findings for Dark Web Monitoring

925 — Your score
8/10

Security Settings
A scan targeting your system security

4. Regulations

Your score

23/30

Regulatory compliance refers to an organization's adherence to established rules, regulations, standards, and best practices that are designed to ensure the security and privacy of digital assets and sensitive information.

1010

5. Custom Checks

Your score

5/5

Custom checks are special checks hand crafted by the team to measure your overall cybersecurity strength and endurance.

1015

Recommended actions for you

Subscribe to Managed Security Testing Services
Leverage the power of Managed Security Testing Services.   [ Get Started ]

Install a Next-Gen Antivirus
Get world class protection by installing a Next generation Antivirus.   [ Get Started ]

Speak with a professional
Connect with one of our representitives to get more insights and advise.   [ Connect ]

Save a copy of your report
Looking to share this with your team? Simply download it as a PDF file.

⇩ Download score sheet

FIG.10

SYSTEMS AND METHODS FOR DYNAMICALLY DETERMINING ASSESSMENT RESULTS

CROSS-REFERENCE TO RELATED APPLICATIONS

The present application claims priority to U.S. Patent Application No. 63/550,312, titled SYSTEMS AND METHODS FOR DYNAMICALLY DETERMINING ASSESSMENT RESULTS, filed on Feb. 6, 2024, the contents of which are hereby incorporated in their entirety.

FIELD

This application relates generally to processing security data and compliance data, and more particularly to configuring/classifying assessment results using security data and/or compliance data.

BACKGROUND

Users of varying degrees of sophistication are required to meet certain security standards and compliance. However, it can be difficult for a user to process large amounts of data from different sources in order to quickly and efficiently monitor security standards. As such, there exists a need for a system that can provide real-time security information for a user.

SUMMARY

The following paragraphs present a summary of various embodiments of the present disclosure and are merely examples of potential embodiments. As such, the summary is not meant to limit the subject matter or variations of various embodiments discussed herein.

In an example embodiment, a method for dynamically determining assessment results is provided. The method includes determining one or more entity assessments to be completed for an account with the one or more entity assessments being related to at least one of security or compliance for the account. The method also includes receiving one or more security data packets used to simulate each of the one or more entity assessments with the one or more security data packets being received from a security database. The method further includes receiving one or more compliance data packets used to simulate each of the one or more entity assessments. The one or more compliance data packets are received from a compliance database and the one or more compliance data packets includes user provided information. The method still further includes determining an entity assessment determination for each of the one or more entity assessments. The entity assessment determination indicates whether the account would pass or fail a given entity assessment of the one or more entity assessments. The method also includes determining a risk score for the account based on the entity assessment determination for each of the one or more entity assessments.

In some aspects, the techniques described herein relate to a method, further including causing a simulation of each of the one or more entity assessments based on the one or more security data packets and one or more compliance data packets.

In some aspects, the techniques described herein relate to a method, further including causing a rendering of the entity assessment determination for each of the one or more entity assessments.

In some aspects, the techniques described herein relate to a method, further including generating a rendering of a portal with the entity assessment determination for one or more of the one or more entity assessments.

In some aspects, the techniques described herein relate to a method, wherein at least one of the entity assessment determination for one or more of the one or more entity assessments includes a plurality of sub-assessments, wherein each of the plurality of sub-assessments include an entity sub-assessment determination.

In some aspects, the techniques described herein relate to a method, wherein the determination of the one or more entity assessments to be completed for an account is based on the account.

In some aspects, the techniques described herein relate to a method, further including determining one or more account changes in order to improve a result for at least one of the one or more entity assessments.

In some aspects, the techniques described herein relate to a method, further including causing a rendering of a representation for each of the one or more account changes to a user interface, wherein each of the one or more account changes are engageable by a user associated with the account.

In some aspects, the techniques described herein relate to a method, further including causing one of the one or more account changes to be implemented in response to an engagement of one of the representation for each of the one or more account changes by the user associated with account.

In some aspects, the techniques described herein relate to a method, wherein the one or more account changes are determined via an artificial intelligence engine based on the account.

In another example embodiment, a system for dynamically determining assessment results is provided. The system including: at least one non-transitory storage device; and at least one processing device coupled to the at least one non-transitory storage device, wherein the at least one processing device is configured to: determine one or more entity assessments to be completed for an account, wherein the one or more entity assessments are related to at least one of security or compliance for the account; receive one or more security data packets used to simulate each of the one or more entity assessments, wherein the one or more security data packets are received from a security database; receive one or more compliance data packets used to simulate each of the one or more entity assessments, wherein the one or more compliance data packets are received from a compliance database, wherein the one or more compliance data packets includes user provided information; determine an entity assessment determination for each of the one or more entity assessments, wherein the entity assessment determination indicates whether the account would pass or fail a given entity assessment of the one or more entity assessments; and determine a risk score for the account based on the entity assessment determination for each of the one or more entity assessments.

In some aspects, the techniques described herein relate to a system, wherein the at least one processing device is further configured to cause a simulation of each of the one or more entity assessments based on the one or more security data packets and one or more compliance data packets.

In some aspects, the techniques described herein relate to a system, wherein the at least one processing device is further configured to cause a rendering of the entity assessment determination for each of the one or more entity assessments.

In some aspects, the techniques described herein relate to a system, wherein the at least one processing device is further configured to generate a rendering of a portal with the entity assessment determination for one or more of the one or more entity assessments.

In some aspects, the techniques described herein relate to a system, wherein at least one of the entity assessment determination for one or more of the one or more entity assessments includes a plurality of sub-assessments, wherein each of the plurality of sub-assessments include an entity sub-assessment determination.

In some aspects, the techniques described herein relate to a system, wherein the determination of the one or more entity assessments to be completed for an account is based on the account.

In some aspects, the techniques described herein relate to a system, wherein the at least one processing device is further configured to determine one or more account changes in order to improve a result for at least one of the one or more entity assessments.

In some aspects, the techniques described herein relate to a system, wherein the at least one processing device is further configured to cause a rendering of a representation for each of the one or more account changes to a user interface, wherein each of the one or more account changes are engageable by a user associated with the account.

In some aspects, the techniques described herein relate to a system, wherein the at least one processing device is further configured to cause one of the one or more account changes to be implemented in response to an engagement of one of the representation for each of the one or more account changes by the user associated with account.

In some aspects, the techniques described herein relate to a system, wherein the one or more account changes are determined via an artificial intelligence engine based on the account.

In still another example embodiment, a computer program product for dynamically determining assessment results is provided. The computer program product including at least one non-transitory computer-readable medium having one or more computer-readable program code portions embodied therein, the one or more computer-readable program code portions including at least one executable portion configured to: determine one or more entity assessments to be completed for an account, wherein the one or more entity assessments are related to at least one of security or compliance for the account; receive one or more security data packets used to simulate each of the one or more entity assessments, wherein the one or more security data packets are received from a security database; receive one or more compliance data packets used to simulate each of the one or more entity assessments, wherein the one or more compliance data packets are received from a compliance database, wherein the one or more compliance data packets includes user provided information; determine an entity assessment determination for each of the one or more entity assessments, wherein the entity assessment determination indicates whether the account would pass or fail a given entity assessment of the one or more entity assessments; and determine a risk score for the account based on the entity assessment determination for each of the one or more entity assessments.

In some aspects, the techniques described herein relate to a computer program product, wherein the one or more computer-readable program code portions include at least one executable portion further configured to cause a simulation of each of the one or more entity assessments based on the one or more security data packets and one or more compliance data packets.

In some aspects, the techniques described herein relate to a computer program product, wherein the one or more computer-readable program code portions include at least one executable portion further configured to cause a rendering of the entity assessment determination for each of the one or more entity assessments.

In some aspects, the techniques described herein relate to a computer program product, wherein the one or more computer-readable program code portions include at least one executable portion further configured to generate a rendering of a portal with the entity assessment determination for one or more of the one or more entity assessments.

In some aspects, the techniques described herein relate to a computer program product, wherein at least one of the entity assessment determination for one or more of the one or more entity assessments includes a plurality of sub-assessments, wherein each of the plurality of sub-assessments include an entity sub-assessment determination.

In some aspects, the techniques described herein relate to a computer program product, wherein the determination of the one or more entity assessments to be completed for an account is based on the account.

In some aspects, the techniques described herein relate to a computer program product, wherein the one or more computer-readable program code portions include at least one executable portion further configured to determine one or more account changes in order to improve a result for at least one of the one or more entity assessments.

In some aspects, the techniques described herein relate to a computer program product, wherein the one or more computer-readable program code portions include at least one executable portion further configured to cause a rendering of a representation for each of the one or more account changes to a user interface, wherein each of the one or more account changes are engageable by a user associated with the account.

In some aspects, the techniques described herein relate to a computer program product, wherein the one or more computer-readable program code portions include at least one executable portion further configured to cause one of the one or more account changes to be implemented in response to an engagement of one of the representation for each of the one or more account changes by the user associated with account.

In some aspects, the techniques described herein relate to a computer program product, wherein the one or more account changes are determined via an artificial intelligence engine based on the account.

Implementation of the method and/or system of embodiments of the present disclosure can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. The memory device(s) discussed herein may include at least one non-transitory storage device. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Many aspects of the present disclosure will be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. It should be recognized that these implementations and embodiments are merely illustrative of the principles of the present disclosure. Therefore, in the drawings:

FIG. 7 illustrates an example user interface with various assessment results rendered, in accordance with various embodiments of the present disclosure;

FIG. 8 illustrates an example user interface with an assessment score sheet rendered, in accordance with various embodiments of the present disclosure;

FIG. 9 illustrates an additional assessment rendering with in-depth information on an entity assessment, in accordance with various embodiments of the present disclosure;

FIG. 10 illustrates another rendering of the user interface with potential account changes for the account, in accordance with various embodiments of the present disclosure;

DETAILED DESCRIPTION

Figure 1:
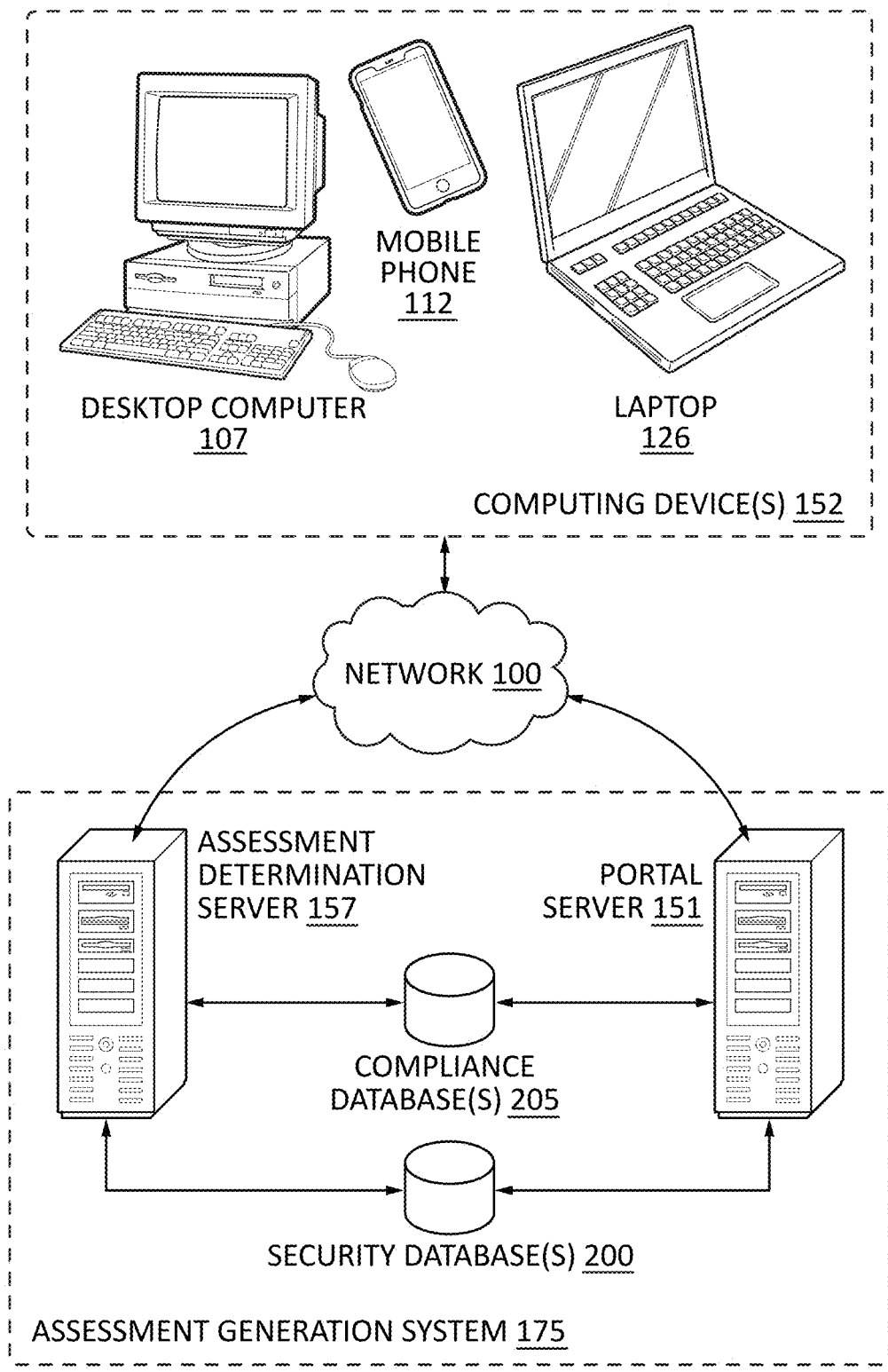
FIG. 1 provides a block diagram illustrating a system environment for dynamically determining assessment results, in accordance with various embodiments of the present disclosure.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements.

Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Throughout this specification and the claims, the terms "comprise," "comprises", and "comprising" are used in a non-exclusive sense, except where the context requires otherwise. Likewise, the term "includes" and its grammatical variants are intended to be non-limiting, such that recitation of items in a list is not to the exclusion of other like items that can be substituted or added to the listed items.

I. Example Use Case

Systems designed to identify cyber-security threats generally gather large volumes of data from numerous data sources, including network traffic data, logs (systems, applications, security devices, cloud resources), threat intelligence feeds, endpoint data, user behavior analysis, file integrity monitoring, vulnerability scans, and dark web monitoring tools. Data gathered from these sources is generally called "Security Data" and may be stored in one or more security databases. Further, these databases may be relational or unstructured, and may form a corpus of data that may be the basis for developing models from the various inputs.

Data may also be gathered related to compliance, which is typically generated based on user responses to questions, or scans. For example, an account may be asked to provide general information relating to cybersecurity, such as number of nodes (e.g., computing devices) on a system, type of security currently implemented, qualified employees, etc. As such, the "compliance data" may be stored in one or more compliance databases. Typically, compliance data and security data are stored by different entities, making it difficult to use both types of data to provide answers to account queries.

Indicators of compromise (IOC) are data points that may indicate systems potentially have been breached by a cyber-threat. IOCs include of digital 'fingerprints' that allow security analysts and researchers the ability to understand and develop means to contain and potentially prevent intrusions earlier in the attack lifecycle. Various embodiments of the present disclosure user IOC data points to determine risk for an account.

Organizations employ numerous processes and tools to handle the large volume of security data and to segment data representing validated security threats from data that is simply a part of normal operations. Tools and applications like Security Information and Event Management (SIEM)

solutions, combined with trained security analysts, review and validate data that is thought to be a security threat. These in turn are often generated into text based reports and stored in a database.

Advanced analytics platforms and threat intelligence solutions are being leveraged to an increasing degree to process substantial volumes of security, risk evaluation, and threat indicator data sets. However, as with all technology-driven analysis, efficacy is ultimately constrained by input data quality and relevance as determined through human assessment. Organizations face significant challenges in maintaining comprehensive visibility into potential attack vectors, vulnerabilities, and risk exposures within their environment as internal and external dynamics continuously evolve. The dissolution of the conventional network perimeter with migration to cloud platforms also introduces new complexity in securing expanding internet-facing assets and preventing threat propagation across interconnected systems. Adopting a data-driven approach to security analytics, while emphasizing integration of qualified human analysis to contextualize technology outputs, can improve organizations' resilience against emergent cyber risks stemming from digital transformation initiatives and a fluid threat landscape.

Artificial intelligence (AI) and machine learning (ML) tools, employing national language processing (NLP) are increasingly used in analyzing these large corpuses of security data; however, AI and ML tools, like all other tools and analysis efforts, are only as good as the data collected. Increased performance in determining security threats can be achieved by augmenting the security data collected with data derived from human-evaluated compliance and security assessments. This form of human validated AI increases performance, and leads to better assessment results.

Compliance and security assessments are performed by trained and certified consultants who are certified in various standards (e.g. Qualified Security Assessor for the Payment Card Industry (PCI) Security Standards Council), and during the course of assessments organizations often provide detailed documentation regarding technology systems, processes, applications, security devices, and other evidence to confirm an organization meets the standards and requirements of a security and compliance standard (e.g., PCI, NIST, ISO 27001, SOC 2).

In addition, expert security consultants are often employed by organizations to assess cyber security maturity and to identify areas of compromise and potential threat vectors. The deliverables from these engagements provide granular insight into security technologies, operations, and security weaknesses within organizations.

Furthermore, smaller organizations who accept credit card payments are required to complete an organization-directed review of security policies, technologies, and tools and to annually report these details via a programmatic Self-Assessment Questionnaire (SAQ) in order to achieve and maintain PCI compliance.

The data sources of consultant-derived reports, organization-generated security evidence, and SAQ data provide a human-curated set of assessment data that is not available to threat models that only employ traditional security data. This expert-curated assessment data enhances the accuracy and efficacy of tools.

The incorporation of security and assessment data correlated with threat intelligence and indicators of compromise enables the analysis of risk in organizations to highlight specific areas of highest risk exposure. The functionality of the risk engine can classify threats categorically and by severity (e.g., FIG. 6). The risk engine incorporates checks (also referred to as entity assessments herein) across several categories that are designed to catalog risks across a wide spectrum of threat surfaces. Vulnerability management encompasses potential risks found on network environment. When applicable, MSS and Endpoint Security utilize installed security appliances and software for additional security telemetry. (e.g., FIG. 7) The risk engine also integrates into a recommendation engine thereupon to provide proposals on bettering your risk exposure through a persona based artificial intelligence (AI) model which describes in detail preventative actions that can be subscribed to. (e.g., FIG. 8)

The present disclosure combines expert-curated compliance assessment data and security assessment data with traditional security data and Indicators of Compromise into an integrated risk score and recommendation engine feedback loop. In various embodiments, mathematical model(s) provides an organization with a described profile of potential exposure that could result in catastrophic damages either monetarily and/or reputationally.

Various embodiments of the present disclosure provide for dynamically determining assessment results. To do this, the system determines one or more entity assessments to be performed for an account (e.g., an entity). The system receives security data and/or compliance data relating to the account. The security data and/or the compliance data are used to simulate the entity assessment and determine a result of the entity assessment (e.g., an entity assessment determination, such as a pass or fail). The results of the entity assessment may be provided to a user via a user interface (e.g., a portal). Additional information may be provided, such as recommended account changes that would improve the assessment results if implemented.

In some aspects, the techniques described herein relate to a method for dynamically determining assessment results, the method including: determining one or more entity assessments to be completed for an account, wherein the one or more entity assessments are related to at least one of security or compliance for the account; receiving one or more security data packets used to simulate each of the one or more entity assessments, wherein the one or more security data packets are received from a security database; receiving one or more compliance data packets used to simulate each of the one or more entity assessments, wherein the one or more compliance data packets are received from a compliance database, wherein the one or more compliance data packets includes user provided information; and determining an entity assessment determination for each of the one or more entity assessments, wherein the entity assessment determination indicates whether the account would pass or fail a given entity assessment of the one or more entity assessments.

In various embodiments, systems and/or computer program products may be provided configured to carry out the operations of the method discussed herein.

In various embodiments, the systems, methods, and computer program products discussed herein may be in any number of different industries. As the amount of different industries that typically were offline become increasingly more online, there is a need for tailored cybersecurity protection. Merchants, for example, that once used analog cash registers now are using computing systems. As such, the customer data is vulnerable, as fewer entities are able to provide security controls. This is evidenced by the amount of merchants that are not PCI compliant. However, the lack of PCI compliance is in large part due to a lack of understanding on the part of the merchants. As such, various embodiments of the present disclosure provide for a tailored experience that allows for entities, regardless of experience, to understand cybersecurity risks.

Various embodiments of the present disclosure provide for risk scoring for an entity. To do this, the system may use security data and/or compliance data to determine an overall risk score for the entity. The risk score may be generated based on past compliance testing (e.g., results of past compliance, such as whether the company completed certain compliance requirements), network complexity (e.g., the security data may indicate the complexity of the system), and/or the like.

The network complexity of the entity may indicate the type of compliance required by the entity. For example, the type of data (e.g., personal identifying information (PII), personal health information (PHI), credit card information, etc.) may require additional compliance and/or may present more risk. As such, the risk score may be based on the amount of risk mitigated by the compliance steps taken to avoid such risk. For example, an entity that stores credit card data may be inherently riskier than an entity that does not store credit card data, however the entity that stores credit card data may have sufficient security to cause the risk score to be lower. The system of various embodiments monitors the network via the security data and/or the compliance data to determine a risk score for the entity. In various embodiments, the risk score may be tailored to the specific entity. The risk score may be normalized for an industry (e.g., the risk score may be based on similarly situated entities).

Figure 6:
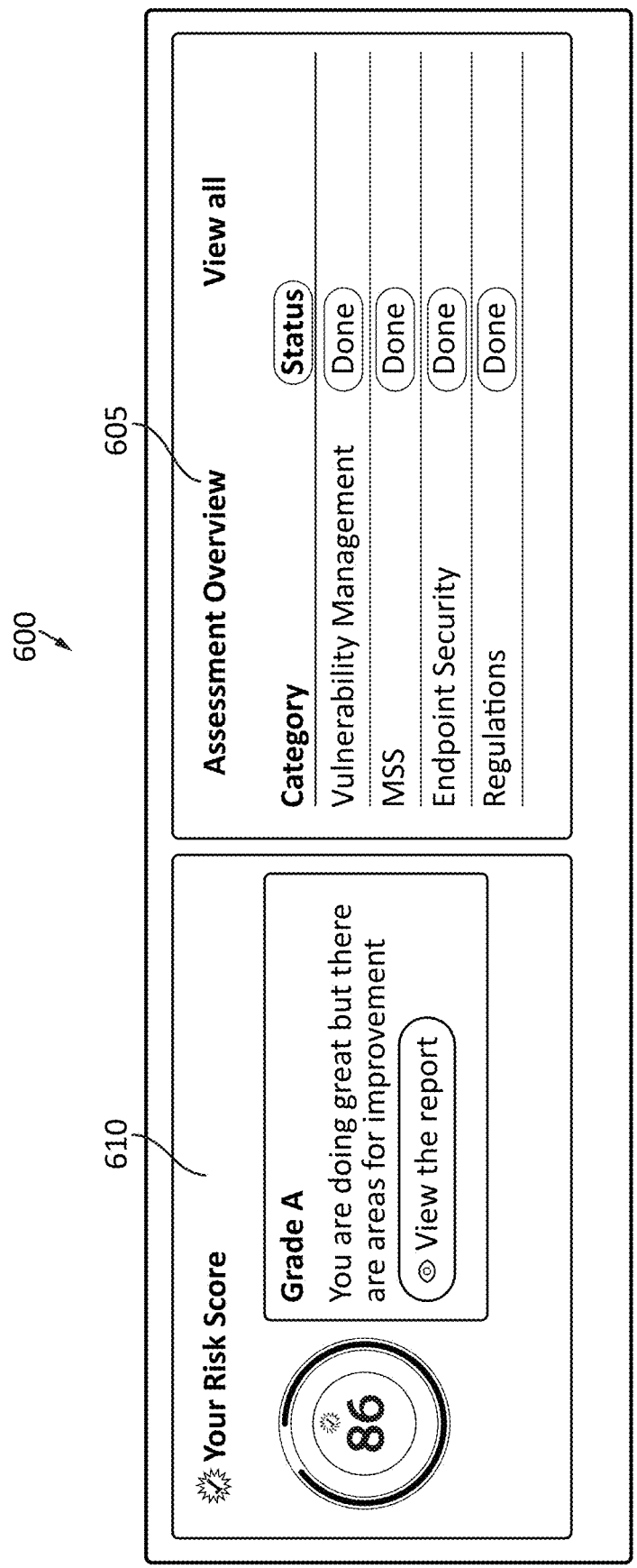
FIG. 6 illustrates an example user interface with an assessment overview and grade rendered, in accordance with various embodiments of the present disclosure.

As discussed in reference to FIG. 6, a user associated with the entity can access a portal that provides information that can be easily understood without the need for cybersecurity expertise. In such an example, the user interface may render the risk score for the entity, as well as information about the risk score. For example, the user interface may include information on reasons for the risk score (e.g., causes of the risk score being low or high), ways to improve the risk score (e.g., improving compliance), and/or the like. As such, a user may be able to access the risk score and information relating to the risk score. The risk score is a parameter defined to aid in understanding for an operator, and may be a singular number (e.g. from 1-10 or 1-100) or letter (e.g., A, B,C, etc.) that represents the overall cybersecurity for the entity.

Additional sub-group risk scores may also be determined and provided. For example, a risk score may be focused on PII protection, while another may be focused on specifically credit card information. In such an example, the different sub-group risk scores may indicate areas that the entity needs to improve. In various embodiments, the system may indicate areas that need to be improved in order to improve the risk score. For example, an entity that failed a compliance test may need to improve on the area that caused the failure.

Various embodiments of the present disclosure provide for compliance test simulation that allows for the compliance to be tested and the risk score determined and/or updated accordingly. As such, the system allows compliance to be dynamic instead of fixed in time (e.g., whenever a compliance test is completed). To do this, the system may determine entity assessments (e.g., compliance and/or security tests) that apply to an entity (or account). The compliance data and/or the security data may be used to simulate the given entity assessment and the system may determine whether the entity would pass or fail the entity assessment (i.e., an entity assessment determination). The risk score for the entity may be determined and/or updated based on the simulated tests.

II. With Reference to the FIGS

Reference will now be made in detail to aspects of the disclosure, examples of which are illustrated in the accompanying drawings. The following description refers to the accompanying drawings in which the same numbers in different drawings represent the same or similar elements unless otherwise represented. The implementations set forth in the following description do not represent all implementations consistent with the disclosure. Instead, they are merely examples of apparatuses and methods consistent with aspects related to the disclosure as recited in the appended claims. Particular aspects of the present disclosure are described in greater detail below. The terms and definitions provided herein control, if in conflict with terms and/or definitions incorporated by reference.

Systems, methods, and apparatuses are described herein which relate generally to dynamically determining assessment results. In the following description, for purposes of explanation, numerous specific details are set forth to provide a thorough understanding of the present disclosure. It will be evident, however, to one skilled in the art that the present disclosure may be practiced without these specific details and/or with any combination of these details.

Referring now to FIG. 1, a block diagram illustrating a system environment ("system") for dynamically determining assessment results, in accordance with various embodiments is provided. The system includes computing device(s) 152 and an assessment generation system 175 connected to a network 100. As shown, the computing device(s) 152 (e.g., desktop computer 107, mobile phone 112, laptop 126, and/or the like) associated with users are in communication with network 100. An assessment generation system 175 is also in communication with the network 100. The assessment generation system 175 comprises a portal server 151 and an assessment determination server 157. In various embodiments, each of the portal server 151 and an assessment determination server 157 may be made of multiple servers. In various embodiments, the portal server 151 and an assessment determination server 157 may be combined into a single server or group of servers.

Security database(s) 200 and/or compliance database(s) 205 may be part or, or in communication with the assessment generation system 175. The security database(s) 200 may include any information gathered during the monitoring of network and/or device security. The information may be associated with an account, such that the information can be referenced based on the account. In various embodiments, security data may be gathered using telemetry monitoring of networks and/or devices. As such, the security data may be generated at least partially automatically. As such, only entities with access to a network or device associated with the user may be able to gather security data. However, in some instances, the security data may be provided to third parties for processing.

An example security database may various columns relating to the security data. For example, the security database may include columns named: ID, submission source, type, name, title, category, backgrounds, recommendations, notes, organization ID, organization paths, severity, confidence, PCI severity, priority, customer priority, tags, asset keys, display name, authoritative ID, username, email, name, cidr, MAC address, IP Address, hostname, protocol, port, event IDs, affected items, references, evidences, text, file, source plugins, source tags, cvssV2Vector, cvssV2Score, cvssV3Vector, cvssV3Score, cvssV4Vector, cvssV4Score, cvssV4Exploitability, cvssV4Complexity, cvssV4VulnerableSystem, cvssV4SubsequentSystem, cvssV4Exploitation, cvssV4SecurityRequirements, CVES, CWES, raw, external ID, external event IDs, extras, keys, value, PCI Pass, workflows, events, is Template, is Deleted, created Instant, and last Updated. The columns of the security database above are merely for example and any number of columns may be used in a given security database.

The compliance database(s) 205 may include any information gathered in relation to compliance. The compliance database(s) 205 may be generally gathered from users associated with the account, such as answering questions relating to compliance. Example questions relating to compliance may include network configuration, number of devices, types of usage, and/or the like. The compliance data gathered and stored in a compliance database(s) 205 may include information gathered based on previous testing (e.g., previous audit results). As such, the compliance database(s) 205 may include various information relating to the network and/or device configuration for the account.

The security database(s) 200 and compliance database(s) 205 may include similar or the same columns. In various embodiments, the system may normalize data packets from the security database(s) 200 and/or compliance database(s) 205 based on the columns in each database. For example, the system may normalize the security data and the compliance data to have the same columns (e.g., only shared column titles may be kept in the normalized data). In various embodiments, the security data and the compliance data may be reformatted to be analyzed with one another. For example, the system may generate a vector index for a given data packet with information from the security data or the compliance data. As such, a vector index created for the security data can be compared with a vector index created for the compliance data.

The security database(s) 200 and/or compliance database(s) 205 may be in communication with various components of the assessment generation system 175 and used to determine simulate entity assessments and determine entity assessment determinations, as discussed herein.

Figure 2:
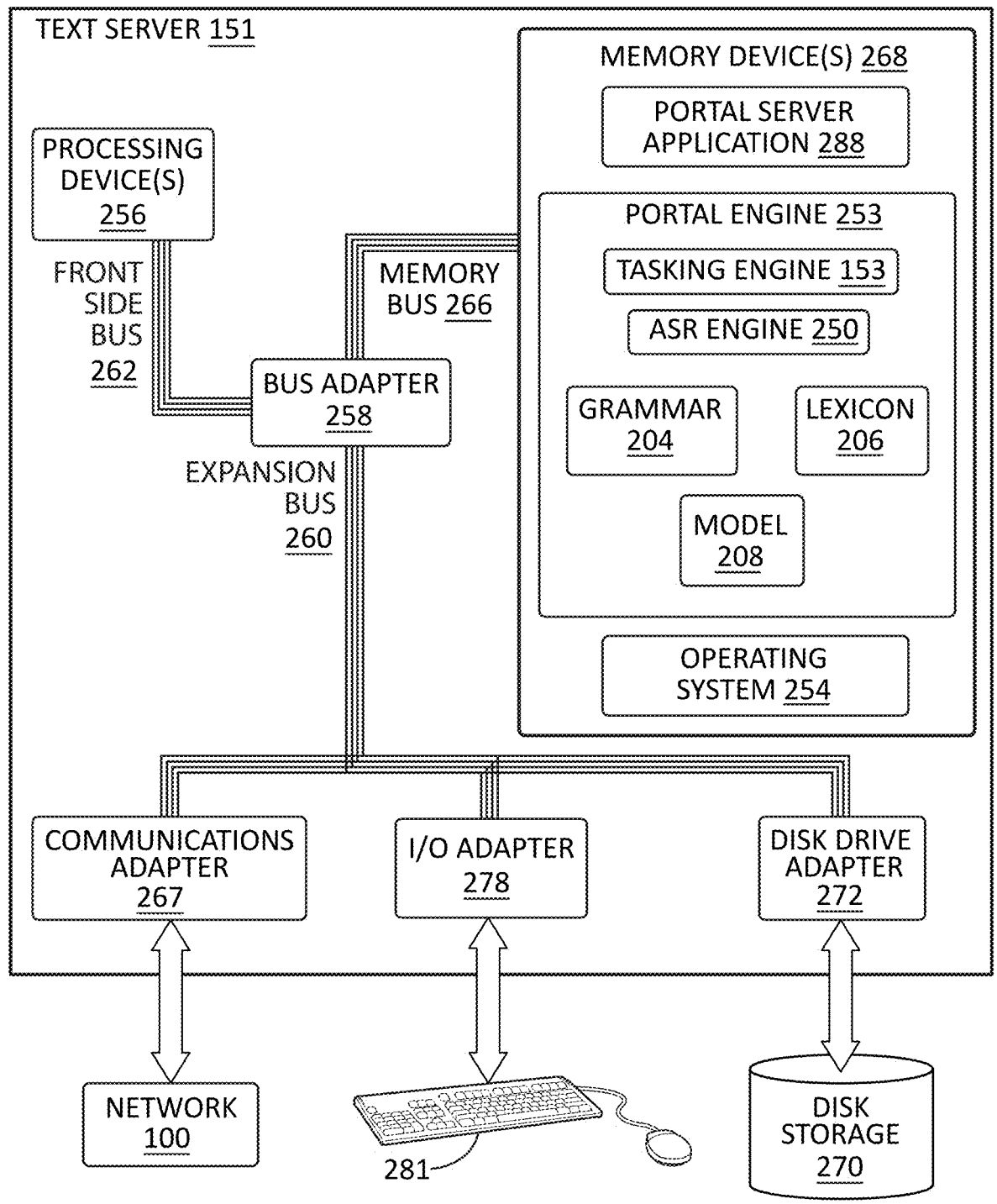
FIG. 2 provides a block diagram illustrating the portal server 151 of FIG. 1, in accordance with various embodiments of the present disclosure.

Referring now to FIG. 2, a block diagram illustrating the portal server 151 of FIG. 1, in accordance with various embodiments is provided. FIG. 2 is merely illustrative an example portal server 151. In various embodiments, the portal server 151 may share components with the assessment determination server 157. The portal server 151 may be comprised of one or more servers. In various embodiments, the portal server 151 may be capable of processing user inputs via a computing device(s) 152 and generating user interfaces to be rendered to computing device(s) 152 based on one or more entity assessment determinations.

The portal server 151 of FIG. 2 includes one or more processing devices 256 and one or more memory devices 268, communication adapter 267, an input/output adapter 278, and a disk drive adapter 272. In various embodiments, the various components may be connected to one another via a BUS adapter 258 (e.g., the processing device(s) 256 may be attached via a front side BUS 262, the memory device(s) 268 may be attached via a memory BUS 266, and the communication adapter 267, I/O adapter 278, disk drive adapter 272, and/or other interfaces may be attached via expansion BUS 260).

It should be understood that the memory device(s) 268 may include one or more databases or other data structures/repositories. The memory device 268 also includes computer-executable program code that instructs the processing device(s) 256 to operate the network communication interface (e.g., communication adapter 267) to perform certain communication functions of the system described herein. For example, in one embodiment of the portal server 151, the memory device 268 includes, but is not limited to, a portal server application 288, a portal engine 253, and an operating system 254. The portal engine 253 may also include a tasking engine 153, an automatic speech recognition (ASR) engine 250, grammar database(s) 204, lexicon database(s) 206, and/or dynamic text modelling 208. The portal engine 253 may have various other components that are capable of processing user inputs via a computing device(s) 152.

Some embodiments of the portal server 151 include processing device(s) 256 communicably coupled to such components as the memory device(s) 268, the communication adapter 267, the input/output adapter 278, the disk drive adapter 272, and/or the like. The processing device(s) 256, and other processors described herein, generally include circuitry for implementing communication and/or logic functions of the system. For example, the processing device(s) 256 may include a digital signal processor device, a microprocessor device, and various analog to digital converters, digital to analog converters, and/or other support circuits. Control and signal processing functions of the portal server 151 are allocated between these devices according to their respective capabilities. The processing device(s) 256 thus may also include the functionality to encode and interleave messages and data prior to modulation and transmission. The processing device(s) 256 can additionally include an internal data modem. Further, the processing device(s) 256 may include functionality to operate one or more software programs, which may be stored in the memory device(s) 268. For example, the processing device(s) 256 may be capable of operating a connectivity program to communicate via the communication adapter 267.

The processing device(s) 256 is configured to connect to the network 100 via the communication adapter 267 to communicate with one or more other devices on the network 100. In this regard, the communication adapter 267 may include various components, such as an antenna operatively coupled to a transmitter and a receiver (together a "transceiver"). The processing device(s) 256 is configured to provide signals to and receive signals from the transmitter and receiver, respectively. The signals may include signaling information in accordance with the air interface standard of the applicable cellular system of the network 100. In this regard, the portal server 151 may be configured to operate with one or more air interface standards, communication protocols, modulation types, and access types. By way of illustration, the portal server 151 may be configured to operate in accordance with any of a number of first, second, third, fourth, and/or fifth-generation communication protocols and/or the like. In various embodiments, the portal server 151 may also be connected via other connection methods to one or more components of the assessment generation system 175 (e.g., the portal server 151 may be hardwired to the assessment determination server 157).

The I/O adapter 278, which allow the portal server 151 to receive data from a user such as a system administrator, may include any of a number of devices allowing the portal server 151 to receive data from the user, such as a keypad, keyboard 281, touch-screen, touchpad, microphone, mouse, joystick, other pointer device, button, soft key, and/or other input device(s). The user interface may also include a camera, such as a digital camera.

The disk drive adapter 272 may provide additional storage space via disk storage 270. Various other storage mediums may also be used by the portal server 151, such as cloud storage (e.g., transmitted via the communication adapter 267).

Figure 3:
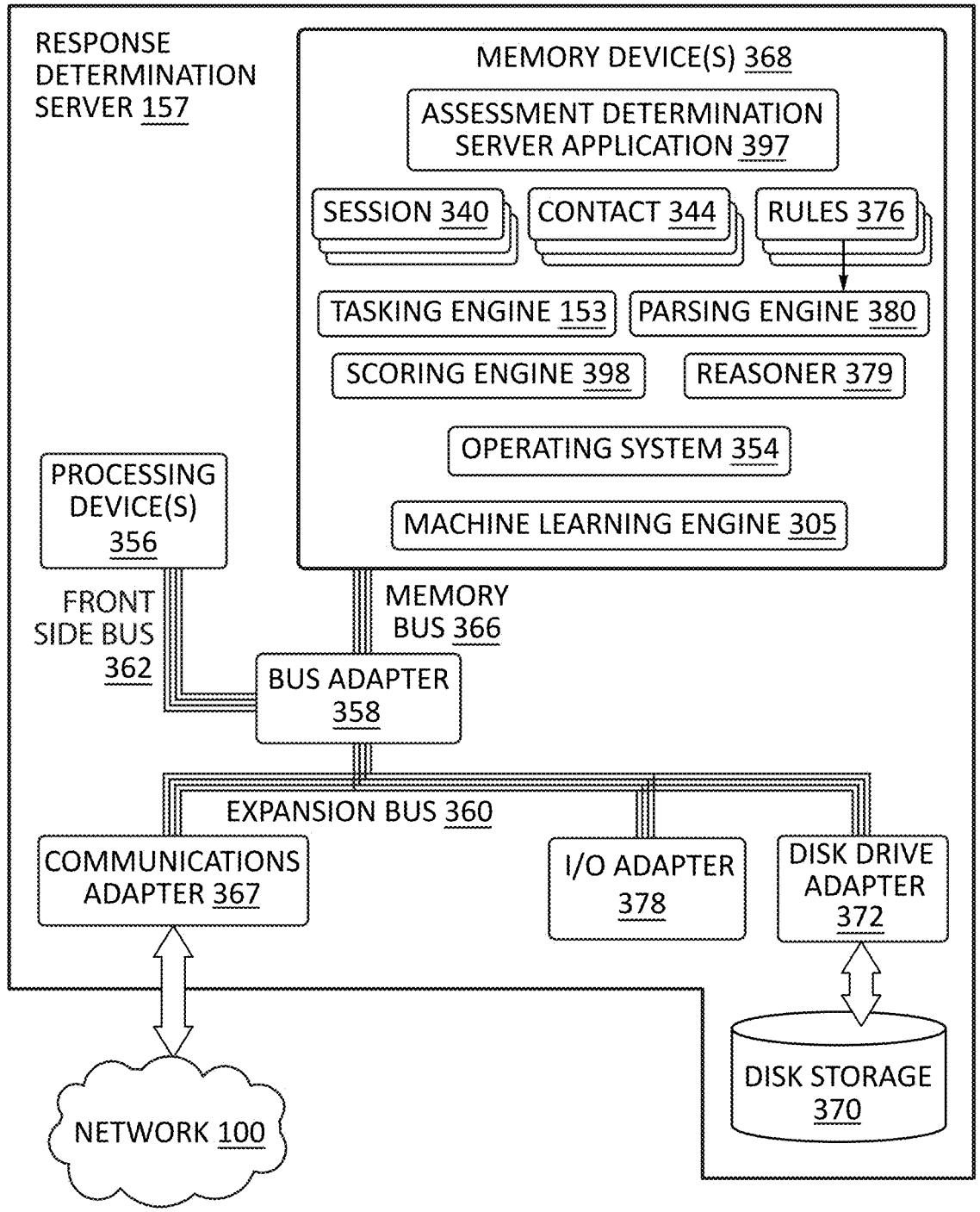
FIG. 3 provides a block diagram illustrating the assessment determination server 157 of FIG. 1, in accordance with various embodiments of the present disclosure.

Referring now to FIG. 3, a block diagram illustrating the assessment determination server 157 of FIG. 1, in accordance with various embodiments is provided. FIG. 3 is merely illustrative an example assessment determination server 157. In various embodiments, the assessment determination server 157 may share components with the portal server 151. The assessment determination server 157 may be comprised of one or more servers.

The assessment determination server 157 of FIG. 3 includes one or more processing devices 356 and one or more memory devices 368, communication adapter 367, an input/output adapter 378, and a disk drive adapter 372. In various embodiments, the various components may be connected to one another via a BUS adapter 358 (e.g., the processing device(s) 356 may be attached via a front side BUS 362, the memory device(s) 368 may be attached via a memory BUS 366, and the communication adapter 367, I/O adapter 378, disk drive adapter 372, and/or other interfaces may be attached via expansion BUS 360).

It should be understood that the memory device(s) 368 may include one or more databases or other data structures/repositories. The memory device 368 also includes computer-executable program code that instructs the processing device(s) 356 to operate the network communication interface (e.g., communication adapter 367) to perform certain communication functions of the system described herein. For example, in one embodiment of the assessment determination server 157, the memory device 368 includes, but is not limited to, an assessment determination server application 397, a tasking engine 153, a parsing engine 380 (that receives information relating to sessions 340, contacts 344, and rules 376), a scoring engine 398, a reasoner 379, an operating system 354, and a machine learning engine 305.

The assessment determination server application 397 may be used to determine entity assessments to perform relating to an account. Additionally, the assessment determination server application 397 may be capable of communicating with other devices on the network 100 via the communication adapter 367. The processing device(s) 356 may use the information stored in the tasking engine 153, the parsing engine 380, the scoring engine 398, and/or the reasoner 379 to process user inputs, determine simulate entity assessments, determine entity assessment determinations, and/or the like.

Some embodiments of the assessment determination server 157 include processing device(s) 356 communicably coupled to such components as the memory device(s) 368, the communication adapter 367, the input/output adapter 378, the disk drive adapter 372, and/or the like. The processing device(s) 356, and other processors described herein, generally include circuitry for implementing communication and/or logic functions of the system. For example, the processing device(s) 356 may include a digital signal processor device, a microprocessor device, and various analog to digital converters, digital to analog converters, and/or other support circuits. Control and signal processing functions of the assessment determination server 157 are allocated between these devices according to their respective capabilities. The processing device(s) 356 thus may also include the functionality to encode and interleave messages and data prior to modulation and transmission. The processing device(s) 356 can additionally include an internal data modem. Further, the processing device(s) 356 may include functionality to operate one or more software programs, which may be stored in the memory device(s) 368. For example, the processing device(s) 356 may be capable of operating a connectivity program to communicate via the communication adapter 367.

The processing device(s) 356 is configured to connect to the network 100 via the communication adapter 367 to communicate with one or more other devices on the network 100. In this regard, the communication adapter 367 may include various components, such as an antenna operatively coupled to a transmitter and a receiver (together a "transceiver"). The processing device(s) 356 is configured to provide signals to and receive signals from the transmitter and receiver, respectively. The signals may include signaling information in accordance with the air interface standard of the applicable cellular system of the network 100. In this regard, the assessment determination server 157 may be configured to operate with one or more air interface standards, communication protocols, modulation types, and access types. By way of illustration, the assessment determination server 157 may be configured to operate in accordance with any of a number of first, second, third, fourth, and/or fifth-generation communication protocols and/or the like. In various embodiments, the assessment determination server 157 may also be connected via other connection methods to one or more components of the portal server 151 (e.g., the portal server 151 may be hardwired to the assessment determination server 157).

The I/O adapter 378, which allow the assessment determination server 157 to receive data from a user such as a system administrator, may include any of a number of devices allowing the assessment determination server 157 to receive data from the user, such as a keypad, keyboard, touch-screen, touchpad, microphone, mouse, joystick, other pointer device, button, soft key, and/or other input device(s). The user interface may also include a camera, such as a digital camera.

The disk drive adapter 372 may provide additional storage space via disk storage 370. Various other storage mediums may also be used by the assessment determination server 157, such as cloud storage (e.g., transmitted via the communication adapter 367).

Figure 4:
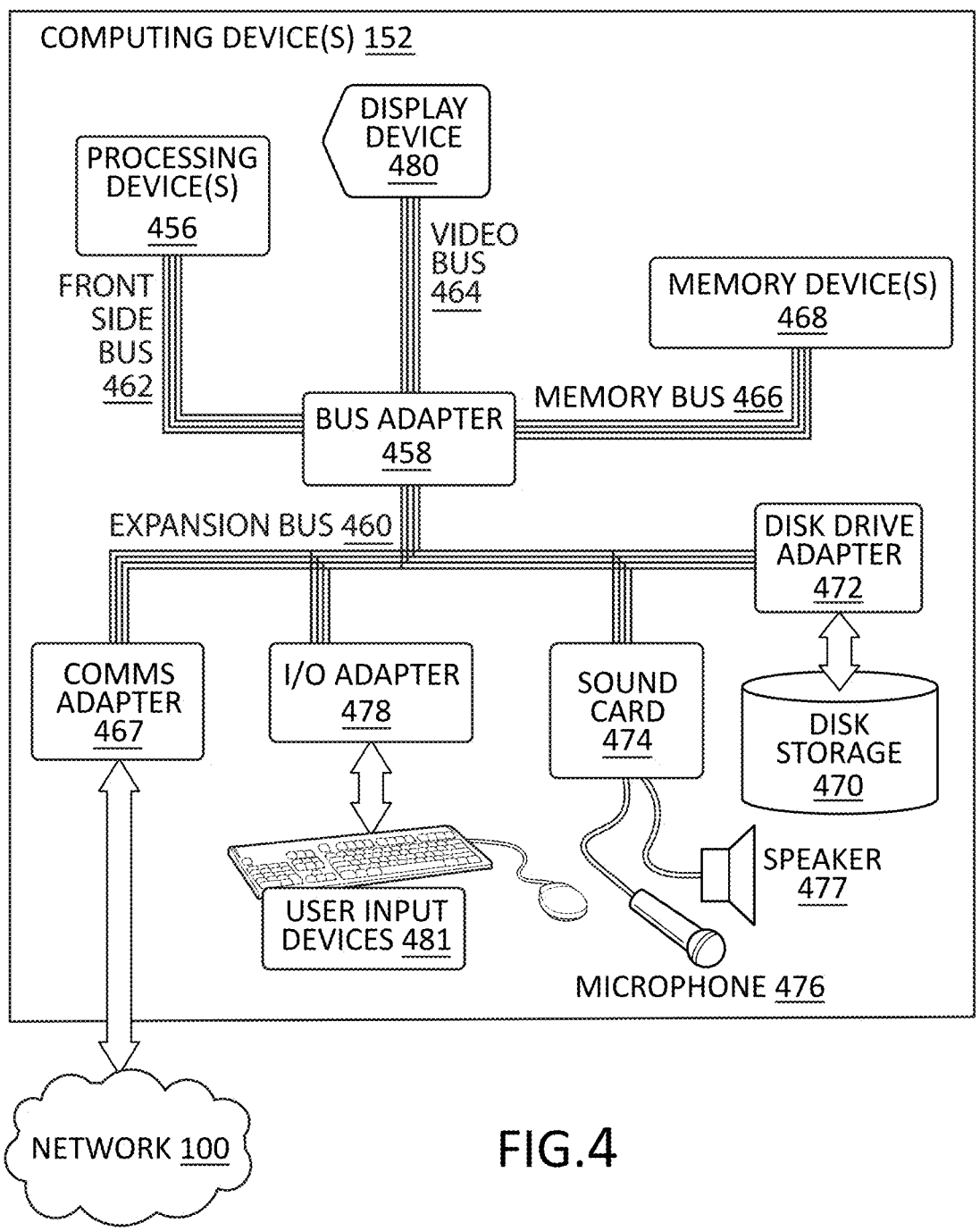
FIG. 4 provides a block diagram illustrating the computing device(s) 152 of FIG. 1, in accordance with various embodiments of the present disclosure.

Referring now to FIG. 4, a block diagram illustrating the computing device(s) 152 of FIG. 1, in accordance with various embodiments is provided. FIG. 3 is merely illustrative an example computing device(s) 152. Various types of computing device(s) 152 may be used or otherwise contemplated for the system. The computing device(s) 152 may be any computing device used by a user to access a user portal (e.g., such as the user interfaces shown in FIGS. 6-10). In various embodiments, the user portal may be browser based (e.g., accessed via a website). Additionally or alternatively, the user portal may be accessed via a downloaded software product installed on the computing device(s) 152.

Example computing devices include desktop computers 107, mobile devices, such as mobile phones 112, tablets, smart watches, etc., laptops 126, and/or the like. As such, the computing device(s) 152 may be any device that is capable of accessing the user portal and includes any capabilities of such a computing device. For example, a mobile phone may include communication interfaces to communication with mobile networks and local area networks (e.g., via Wi-Fi).

The computing device(s) 152 of FIG. 4 includes one or more processing devices 456, one or more memory devices 468, a display device 480, a communication adapter 467, an input/output adapter 478, and a disk drive adapter 472. In various embodiments, the various components may be connected to one another via a BUS adapter 458 (e.g., the processing device(s) 456 may be attached via a front side BUS 462, the memory device(s) 468 may be attached via a memory BUS 466, the display device 480 may be attached via a video BUS 464, and the communication adapter 467, I/O adapter 478, disk drive adapter 472, and/or other interfaces may be attached via expansion BUS 460).

It should be understood that the memory device(s) 468 may include one or more databases or other data structures/repositories. The memory device 468 also includes computer-executable program code that instructs the processing device(s) 456 to operate the network communication interface (e.g., communication adapter 467) to perform certain communication functions of the system described herein.

Some embodiments of the computing device(s) 152 include processing device(s) 456 communicably coupled to such components as the memory device(s) 468, the communication adapter 467, the input/output adapter 478, the disk drive adapter 472, and/or the like. The processing device(s) 456, and other processors described herein, generally include circuitry for implementing communication and/or logic functions of the system. For example, the processing device(s) 456 may include a digital signal processor device, a microprocessor device, and various analog to digital converters, digital to analog converters, and/or other support circuits. Control and signal processing functions of the computing device(s) 152 are allocated between these devices according to their respective capabilities. The processing device(s) 456 thus may also include the functionality to encode and interleave messages and data prior to modulation and transmission. The processing device(s) 456 can additionally include an internal data modem. Further, the processing device(s) 456 may include functionality to operate one or more software programs, which may be stored in the memory device(s) 468. For example, the processing device(s) 456 may be capable of operating a connectivity program to communicate via the communication adapter 467.

The processing device(s) 456 is configured to connect to the network 100 via the communication adapter 467 to communicate with one or more other devices on the network 100. In this regard, the communication adapter 467 may include various components, such as an antenna operatively coupled to a transmitter and a receiver (together a "transceiver"). The processing device(s) 456 is configured to provide signals to and receive signals from the transmitter and receiver, respectively. The signals may include signaling information in accordance with the air interface standard of the applicable cellular system of the network 100. In this regard, the computing device(s) 152 may be configured to operate with one or more air interface standards, communication protocols, modulation types, and access types. By way of illustration, the computing device(s) 152 may be configured to operate in accordance with any of a number of first, second, third, fourth, and/or fifth-generation communication protocols and/or the like).

The I/O adapter 478, which allow the computing device(s) 152 to receive data from a user such as a system administrator, may include any of a number of devices allowing the computing device(s) 152 to receive data from the user, such as a keypad, keyboard 481, touch-screen, touchpad, microphone, mouse, joystick, other pointer device, button, soft key, and/or other input device(s). The user interface may also include a camera, such as a digital camera.

The disk drive adapter 472 may provide additional storage space via disk storage 470. Various other storage mediums may also be used by the computing device(s) 152, such as cloud storage (e.g., transmitted via the communication adapter 467).

As described above, the computing device(s) 152 has a user interface that is, like other user interfaces described herein, rendered via the display device 480. The display device 480 include a display (e.g., a liquid crystal display or the like) and/or a speaker or other audio device, which are operatively coupled to the processing device(s) 456. As such, the user portal and user interfaces discussed herein may be provided to the computing device(s) 152 via the display device 480 (e.g., visually via the user interface and/or audibly via the speaker or other audio device). in various embodiments, the display device 480 may be in communication with a sound card 474 (e.g., attached to a microphone 476 and/or a speaker 477 (e.g., the speaker 477 may be part of the display device 480 or standalone)).

Figure 5:
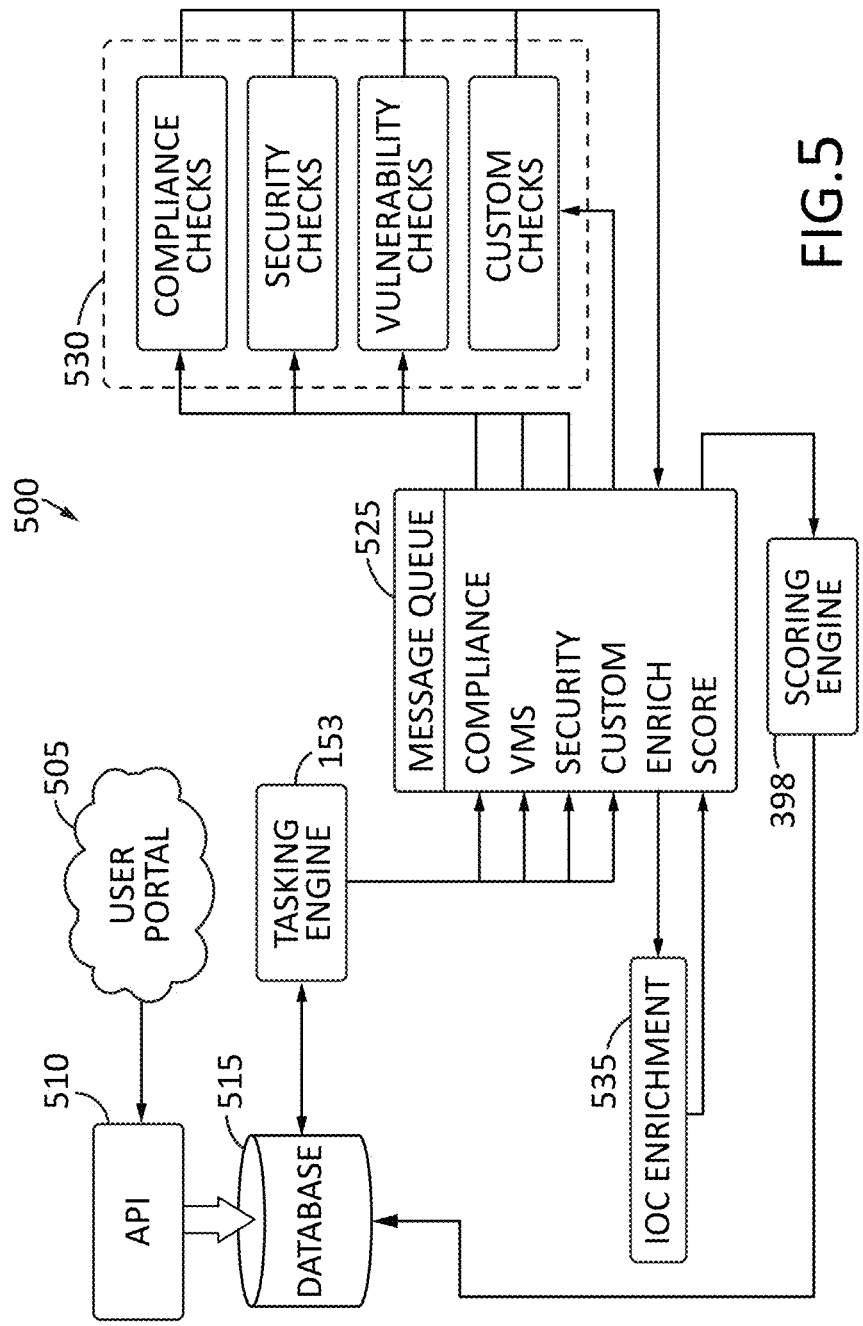
FIG. 5 provides a flowchart 500 illustrating the high-level processing of the operations discussed herein, such as the operations of FIGS. 11 and 12, in accordance with various embodiments of the present disclosure.
Figure 11:
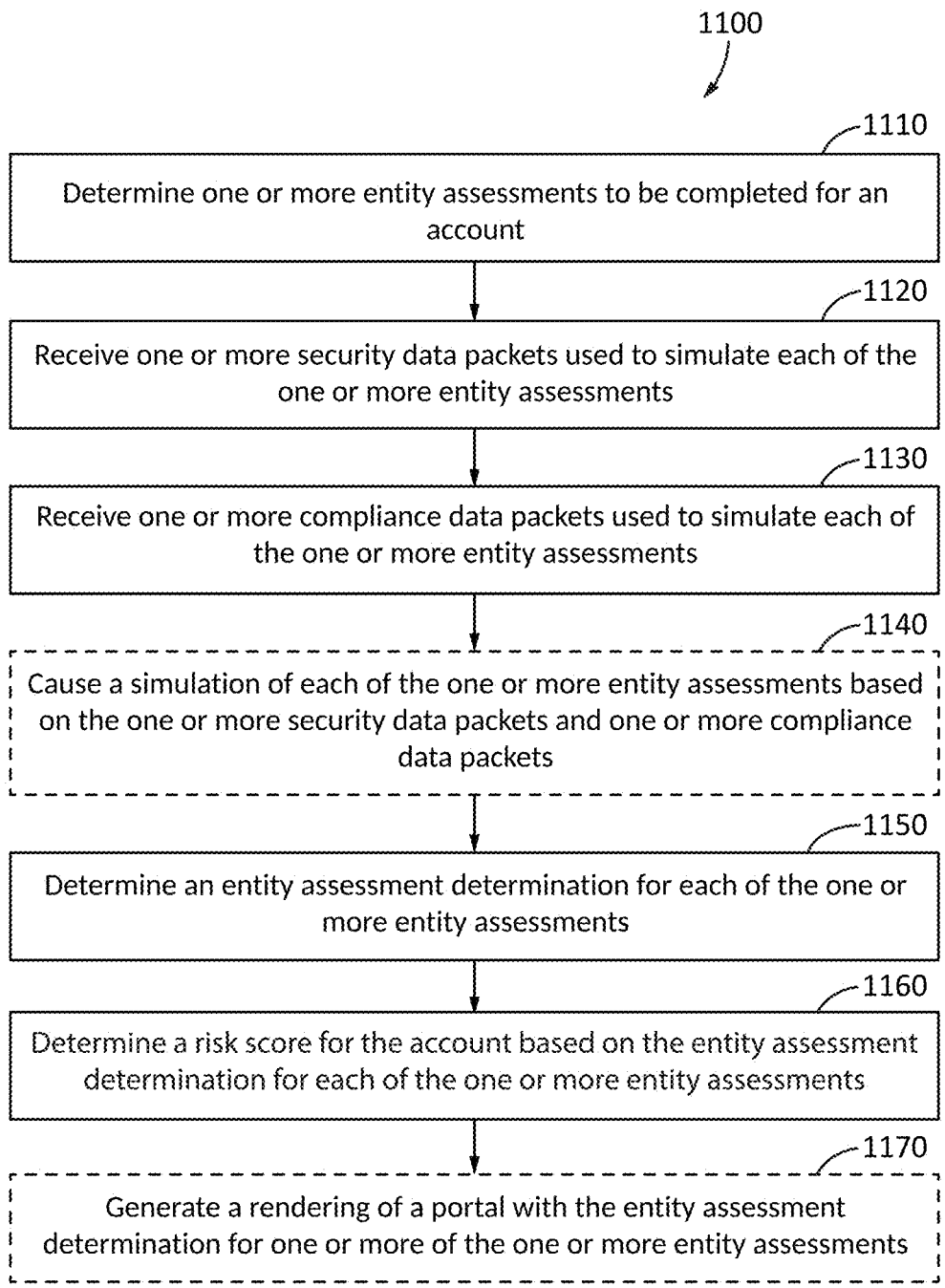
FIG. 11 is a flowchart 1100 illustrating an example operation of dynamically determining assessment results, in accordance with various embodiments of the present disclosure.
Figure 12:
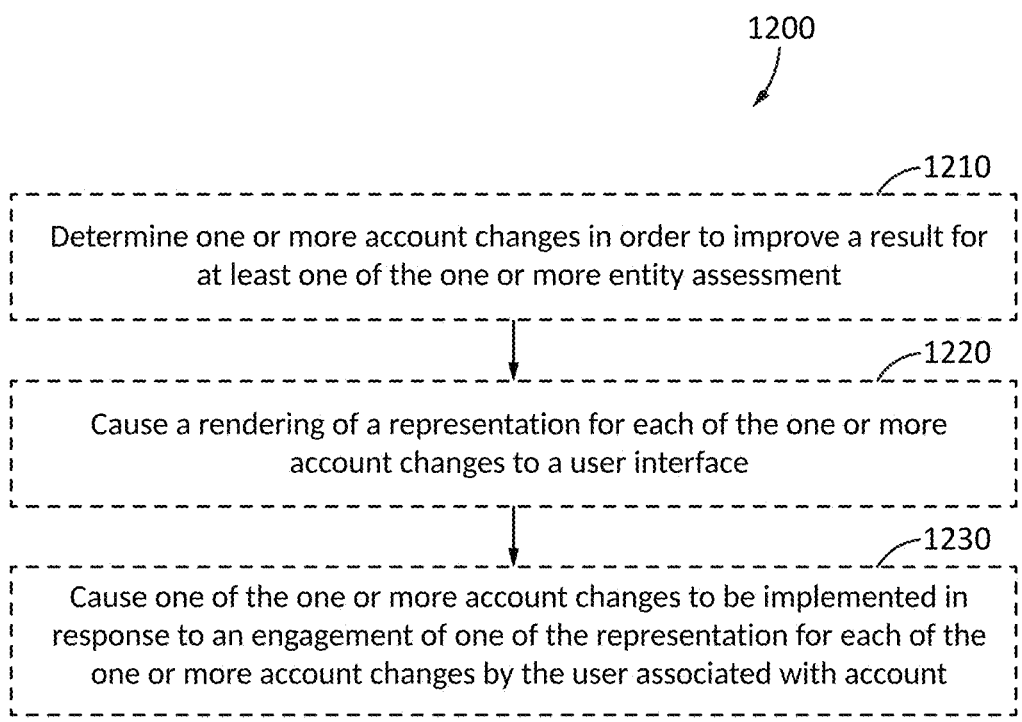
FIG. 12 is a flowchart 1200 illustrating an example operation of determining account change(s) for the account, in accordance with various embodiments of the present disclosure.

Referring now to FIG. 5, a flowchart 500 is provided illustrating the high-level processing of the operations discussed herein, such as the operations of FIGS. 11 and 12. The operations are discussed in more detail in reference to FIGS. 11 and 12. The engines and/or databases shown in FIG. 5 may be part of any of the one or more of the components discussed in reference to FIG. 1. For example, the tasking engine and the scoring engine may be part of the assessment generation system 175 (e.g., the assessment determination server 157, the portal server 151, etc.) and/or the client computing device(s) 152. Additionally, unless otherwise stated, the operations of FIGS. 5, 11, and 12 may be carried out by the same system, such as the systems of various embodiments discussed herein.

As shown, a user portal 505 may be provided to a user interface displayed on a computing device(s) 152. For example, the computing device(s) 152 may execute an API 510 that includes the user portal 505. As such, a user associated with an account may engage with information relating to the account (e.g., view assessment results, indicate assessments to simulate, view and/or select account change(s), and/or the like). An example user portal may be shown in FIGS. 6-10.

The API 510 may communicate with one or more databases (e.g., database 515). The database 515 may include information relating to the account, such as security data, compliance data, entity information, and/or the like. For example, the database 515 may be (or otherwise receive information from) the security database(s) 200 and/or the compliance database(s) 205. In various embodiments, security data may be stored in one or more security databases and compliance data may be stored in one or more compliance databases. Additionally or alternatively, security data and compliance data may be stored in the same database(s) (e.g., database 515). The information stored on the database(s) (e.g., database 515) may be used by the various processing operations discussed herein.

The system may have a tasking engine 153 that determines entity assessments to be simulated for a given account. In various embodiments, the selection of the entity assessments to be simulated may be based on characteristics of the account. For example, the type of entity (e.g., industry), type of information stored (e.g., personal identifying information may be more sensitive and require higher compliance standards), user provided assessments (e.g., a user may indicate entity assessment(s) that an account should be tested), previous assessments (e.g., the results of previous entity assessments may indicate that the given entity assessment should be simulated) and/or the like. Based on the selection of the entity assessment(s) by the tasking engine 153, the tasking engine may select one or more types of data to be used for the assessment simulation (e.g., message queue 525 shows potential data types that include security data, compliance data, VMS data, and/or custom data). At block 530, the various entity assessments (e.g., checks) may be completed (e.g., simulated) and return information to the system based on the simulated entity assessment (e.g., compliance checks, security checks, vulnerability checks, and/or custom checks). The results of the entity assessments may be enriched by the system (e.g., using Indicators of Compromise (IOC) enrichment 535). The enrichment may allow the system to complete any areas of the entity assessment that were not completed or were inconclusive. For example, a simulated entity assessment may indicate that a certain part of the test is inconclusive and the system may use IOC enrichment to determine any parts that can be updated (e.g., the system may reference compliance data for the entity to determine whether the part of the test is completed). Upon enrichment of the simulated entity assessments results, a score can be generated that may be used to determine an entity assessment determination for each entity assessment. The scoring engine 398 may also be in communication with one or more databases (e.g., database 515) that store the score information and/or the entity assessment determination(s). Additionally, the score information and/or the entity assessment determination(s) may be provided to the user portal 505, as shown in FIGS. 6-10.

FIGS. 6-10 illustrate various user interfaces rendered for a user (e.g., via a portal) in accordance with various embodiments. As shown, the portal may include various graphical and/or visual representations of one or more entity assessments. Any of the interfaces shown may be rendered with one another (e.g., the information in FIG. 6 and FIG. 7 may be shown via the same user interface).

Referring now to FIG. 6, an example user interface 600 is shown with an assessment overview portion 605 and a risk score portion 610 rendered in accordance with various embodiments. The assessment overview portion 605 may include one or more categories that are monitored in order to catalog risks across different threat areas. As shown, the categories may include Vulnerability Management, Managed Security Services (MSS), Endpoint Security, and Regulation. For example, vulnerability management encompasses potential risks found on network environment, and MSS and Endpoint Security use installed security appliances and software for additional security telemetry. Any number of categories may be represented or shown. The categories may be based on the entity assessments simulated for the given account (e.g., each category may correspond to one or more entity assessments simulate for the given account). Additionally, a status of the category may also be shown that indicates whether the entity assessment(s) have been performed and/or whether the account passed the entity assessment. Various categories may also have additional sub-categories (e.g., as shown in FIG. 7, in which a parent category may have one or more service categories).

The risk score portion 610 may include a score or grade for the risk of the account. In various embodiments, the "risk score" may be for the entity account (e.g., for multiple categories across the entire network). In various embodiments, different categories may also have risk scores or grades. As shown, the risk score may be provided numerically (e.g., a score of 86), alphabetically (e.g., "Grade A"), and/or visually (e.g., the score may be represented by a graph or via different colors, such as green for pass and red for fail). In various embodiments, additional information relating to the risk score may be provided (e.g., via engaging "View the Report" on the risk score portion 610).

In various embodiments, the risk score may be based on the results of the simulated entity assessment(s). As such, the risk score may be higher in an instance in which the simulated entity assessment(s) are positive. In various embodiments, the risk score may be directly based on the results of the simulated entity assessment(s). For example, in an instance in which the entity has five relevant entity assessment, each entity assessment may be given 20% weight such that the risk score may be 0 (e.g., in an instance in which the entity passes zero of the simulated entity assessments), 20 (e.g., in an instance in which the entity passes one of the simulated entity assessments), 40 (e.g., in an instance in which the entity passes two of the simulated entity assessments), 60 (e.g., in an instance in which the entity passes three of the simulated entity assessments), 80 (e.g., in an instance in which the entity passes four of the simulated entity assessments), or 100 (e.g., in an instance in which the entity passes five of the simulated entity assessments). In various embodiments, an entity assessment may not necessarily be binary (e.g., pass or fail). For example, an entity assessment may have multiple components and the result may indicate a score for the given entity assessment. As such, the risk score may be based on the score for the entity assessment(s).

In some embodiments, different entity assessments may have different weight in determining the risk score. For example, a first entity assessment may be a larger indicator of the total risk than a second entity assessment, and therefore the first entity assessment may have a greater weight in determining the risk score. As such, the first entity assessment may have a greater weight than a second entity assessment. The weight of the given entity assessment may be based on the relevance of the entity assessment to cybersecurity. For example, a first entity assessment may be associated with PII storage and the second entity assessment may be associated with data storage that does not include PII. As the PII data may be considered higher priority than the non-PII data, the first entity assessment associated with the PII data may be given more weight than the second entity assessment when determining risk score.

In various embodiments, the results of the simulated entity assessment(s) may be only a portion of the determination of the risk score. For example, the simulated entity assessment(s) may be a first percentage of the risk score determination and other factors may be considered for the remaining determination. Other factors may include entity type (e.g., industry of entity), sophistication of entity (e.g., type of data being stored), experience and/or expertise of entity (e.g., does the entity have users that understand cybersecurity), entity activity (e.g., the system may monitor the actions of the entity to detect risker behavior), and/or the like. In various embodiments, the risk score may be determined using multiple different factors (e.g., entity assessment(s) and/or other factors) to determine a risk score.

In various embodiments, a sub-group risk score may be determined based on one or more factors used to determine the risk score. In various embodiments, the simulated entity assessment(s) may be targeted to a specific type of security and/or compliance. As such, a sub-set of the simulated entity assessment(s) may be used to determine sub-group risks. For example, the system may generate a risk score (e.g., that generally indicates the risk score for the entity as a whole), as well as one or more sub-group risk scores, such as a security risk score (e.g., that indicates the cybersecurity of the entity based on procedures and structure) and/or a compliance risk score (e.g., how well the entity has adhered to specific guidelines or requirements). In various embodiments, a simulated entity assessment may be used for multiple sub-group risk scores.

Referring now to FIG. 7, an example user interface 700 is shown with various assessment results rendered in accordance with various embodiments. User interface 700 illustrates an example assessment overview for an account. As shown, the account 705 is "ACME Automobile Center." Block 710 illustrates an overview of the results (e.g., Risk score of A or 90.9%, 17 passed checks (e.g., passed entity assessments), and five failed checks (e.g., failed entity assessments). The assessment overview also displays the individual checks for each category (and sub-category) 715. As shown, for vulnerability management, the web application security had five checks (e.g., entity assessments) for the vulnerability management and four out of five of the checks were passed by the account. In various embodiments, the system may determine a percentage of passed checks required to indicate a sufficient level of security. Alternatively, a singular failed check may indicate that a failure for the given category (and subsequently a lower risk score). In various embodiments, the failed checks may be used to determine account changes that would increase the risk score. For example, an account change may be recommended to fix a vulnerability and cause a given check to be passed on a subsequent simulation.

Referring now to FIG. 8, an example user interface 800 is shown with an assessment score sheet rendered in accordance with various embodiments. The assessment score sheet may be generated as a report. The assessment score sheet may include various information relating to overall risk score or grade, performance across different categories, recommended account change(s), and/or the like.

The risk score may be provided at Block 805. The risk score may be determined as discussed above in reference to FIG. 6. As shown, the risk score may include a numerical value (e.g., 90.9), an alphabetical grade (e.g., "Grade A"), a graphical representation (e.g., a bar chart), visual representation (e.g., the color of at least a portion of the information may be color coordinated to illustrate a performance, such as green indicating a high risk score).

The performance across different categories are shown in Block 810. The performance across different categories may be considered a sub-group risk score, as discussed above. As such, the user is displayed different sub-groups that make up the total cybersecurity environment. For example, examples shown are website security, custom checks, endpoint security, vulnerability management, and regulations (e.g., adherence to compliance requirements). Additional information may also be provided, such as the number of applicable entity assessments for each sub-group. For example, as shown, the vulnerability management has a performance of 88%, which corresponds to a 31/35 for entity assessments.

In various embodiments, the system may determine account changes (e.g., recommended actions) to improve the risk score. An account change may be any action that affects the system, such as installing programs or software, contacting support persons, conducting additional checks, and/or the like. The determination of account changes may be based on the results of the simulated entity assessments. In some instances, the determination of account changes may be based on the specific failing of a simulated entity assessment. For example, a simulated entity assessment may include a checklist that certain programs and/or protections are in place. In an instance the entity assessment is failed due to the checklist item not being present, the account change may be directed to fixing the checklist item (e.g., installing a program or putting a protection in place). In various embodiments, the account changes may be based on similar entities (e.g., entities in the same industry may have common issues relating to cybersecurity).

The system may also determine a potential change in risk score based on the account change. For example, the system may determine the risk score in an instance in which an issue found during the entity assessment(s) is fixed. For example, in an instance in which an entity assessment requires the entity to have a specific program installed, the system may determine the change in risk score in an instance in which the specific program was installed.

In various embodiments, the account changes and/or the potential change in risk score may be provided to the user via the user interface, as shown in Block 815. Example account changes include subscribing to a managed security testing service, installing a next-generation antivirus, speaking with a professional, and/or the like. The system may also indicate the potential change in the risk score in an instance in which one or more account changes are implemented (e.g., the user interface 800 indicates that the score could be increased by 9 points by implementing each of the account changes).

In various embodiments, the system may carry out at least a portion of the account changes. For example, a user may select an account change and the system may either automatically implement the account change (e.g., the antivirus may be installed in an instance in which the account change is installing a next-generation antivirus) or begin the process of implementing the account change (e.g., a user may be provided the instructions for completing the account change). In various embodiments, the system may implement one or more account changes without user selection (e.g., the user may approve the system to automatically implement account changes).

In various embodiments, one or more entity assessments may be simulated again once the account changes are implemented. The system may repeat any entity assessments that may be affected by the account changes. Alternatively, the system may repeat all previously simulated entity assessments (to ensure that the account changes did not have a negative effect on other entity assessments). In various embodiments, regardless of account changes being implemented or not, the system may simulate one or more entity assessments periodically (e.g., the system may simulate the entity assessment(s) daily, weekly, monthly, quarterly, etc.).

Referring now to FIG. 9, an additional assessment rendering is shown with in-depth information of a sub-group including the entity assessments associated with the sub-group via user interface 900. As shown, the user interface 900 may provide more detailed information for each sub-group (e.g., vulnerability management). The in-depth assessment information may include overall score 905 (e.g., number of total checks passed), score for sub-categories (e.g., passed tests for web application security 910, passed tests for network security 915, passed tests for dark web findings 920, and passed tests for system security 925). As shown, the specific checks (e.g., entity assessments) that were passed or failed may also be shown.

Referring now to FIG. 10, another rendering of the user interface 1000 is shown with potential account changes for the account in accordance with various embodiments. The user interface 1000 may be an extension of the in-depth information shown in FIG. 9 for regulations and custom checks. As shown, each category may have a score (e.g., number of checks passed out of all checks for the category). For example, the Regulations 1005 has a 23/30 score and the custom checks 1010 has a 5/5 score. The custom checks may include any checks that were chosen by an expert for the account.

Account changes may also be provided at Block 1015. The recommended account changes may be the same as the account changes discussed in reference to FIG. 8. Alternatively, the system may determine additional account changes specific to the given sub-group. For example, the system may generate account changes that are targeted at improving a specific sub-group.

Referring now to FIG. 11, a flowchart 1100 is provided illustrating a method of dynamically determining assessment results in accordance with various embodiments. The method discussed herein may be carried out by one or more of the components discussed in reference to FIG. 1. For example, the method may be carried out by the assessment generation system 175 (e.g., the assessment determination server 157, the portal server 151, etc.) and/or the client computing device(s) 152. The operations of the method may be carried out by a system as discussed herein. Additionally, a computer program product may include executable portion(s) that are configured to carry out the method herein.

Unless otherwise stated, the operations of FIGS. 11 and 12 may be carried out by the same system, such as the systems of various embodiments discussed herein. FIGS. 6-10 illustrate example user interfaces showing the results of various operations from FIGS. 11-12.

Referring now to Block 1110 of FIG. 11, the method includes determining one or more entity assessments to be completed for an account. In various embodiments, the one or more entity assessments are related to at least one of security or compliance for the account. In various embodiments, the determination of the one or more entity assessments to be completed for an account is based on the account. In various embodiments, the type of entity associated with the account (e.g., entity size, industry, etc.), the type of data handled by the account, user provided assessments (e.g., a user may indicate entity assessment(s) that an account should be tested), and/or the like, may be used to determine entity assessments. One or more of the entity assessment(s) may be standard. For example, every entity that stores any data may have an entity assessment relating to data storage.

In various embodiments, one or more of the entity assessment(s) may be determined based on information provided by the entity (e.g., an entity may indicate the standards for which they are required and/or desire to adhere and the standards may have corresponding entity assessments). For example, a user associated with an entity may provide information, such as entity type, data being stored and/or transmitted, and/or the like. Based on the entity provided information, the system may determine one or more entity assessments.

In various embodiments, one or more of the entity assessment(s) may be determined based on security data and/or compliance data. For example, the system may determine based on security data and/or compliance data the type of data being stored and/or transmitted, the amount of data being stored and/or transmitted, and/or the like. For example, the system may determine that an entity stores and/or transmits PII and the system may then determine one or more entity assessments that relate to the storing and/or transmission of PII.

Referring now to Block 1120 of FIG. 11, the method includes receiving one or more security data packets used to simulate each of the one or more entity assessments. The security data packet(s) may be received from a security database (e.g., security database(s) 200 shown in FIG. 1). In various embodiments, security data packets may include monitored information relating to the account, such as telemetry data, network information, etc. The security data packet(s) may be associated with the given account (e.g., the system may request information from the security database(s) 200 that are related to the given account).

In various embodiments, the system may request security data packet(s) from such databases that relate to the account. In various embodiments, the system may request or otherwise receive any security data packet(s) associated with the account. For example, the system may transmit a request for any security data packet(s) that mention the account and/or include an account identifier.

In various embodiments, the system may generate at least one of the one or more security data packets in the security database based on monitored telemetry data relating to the account. In various embodiments, networks and computing devices may be monitored. For example, a company may have a software installed on the network to monitor the operations of the network (e.g., network health, network capacity, network usage, device health, device capacity, device usage, and/or the like). Such security data may be stored for processing as discussed herein. In various embodiments, the security database(s) 200 may store raw data and/or processed data (e.g., normalized across the entire database).

The security database(s) 200 may include any information gathered during the monitoring of network and/or device security. The information may be associated with an account, such that the information can be referenced based on the account. In various embodiments, security data may be gathered using telemetry monitoring of networks and/or devices. As such, the security data may be generated at least partially automatically. As such, only entities with access to a network or device associated with the user may be able to gather security data. However, in some instances, the security data may be provided to third parties for processing.

Referring now to Block 1130 of FIG. 11, the method includes receiving one or more compliance data packets used to simulate each of the one or more entity assessments. The compliance data packet(s) may be received from a compliance database (compliance database(s) 205 shown in FIG. 1). In various embodiments, the one or more compliance data packets may include user provided information. For example, a user associated with the account may provide information relating to the account.

In various embodiments, the system may request compliance data packet(s) from such databases that relate to the account. In various embodiments, the system may request or otherwise receive any compliance data packet(s) associated with the account. For example, the system may transmit a request for any compliance data packet(s) that mention the account and/or include an account identifier.

Referring now to optional Block 1140 of FIG. 11, the method includes causing a simulation of each of the one or more entity assessments based on the one or more security data packets and one or more compliance data packets. The simulation of an entity assessment may use the information from the security database(s) 200 and/or the compliance database(s) 205. For example, the system may use the information to determine whether the given account meets the standards for a given entity assessment.

In various embodiments, the simulation may consider previous assessment results. For example, the system may determine whether any changes to the account has occurred that would cause the results of the entity assessment to be different. Additionally or alternatively, the system may use machine learning model(s) to simulate the entity assessments (e.g., using previous known assessment results as a training set to train and/or update the machine learning model).

Referring now to Block 1150 of FIG. 11, the method includes determining an entity assessment determination for each of the one or more entity assessments. The entity assessment determination may be a grade or score that indicates whether the account would pass or fail the given entity assessment. The entity assessment determination may be made for multiple different categories, as shown in FIGS. 6-10. The entity assessment determination may also include a determination of whether any account changes are necessary or recommended, as discussed in operational flowchart 1200 of FIG. 12.

Referring now to Block 1160 of FIG. 11, the method includes determining a risk score for the account based on the entity assessment determination for each of the one or more entity assessments. In various embodiments, determining the risk score may be either determining or updating an existing risk score. In various embodiments, the determination of the risk score may be the same as discussed in reference to FIG. 6 above.

In various embodiments, the risk score may be higher in an instance in which the simulated entity assessment(s) are positive. In various embodiments, the risk score may be directly based on the results of the simulated entity assessment(s). In some embodiments, different entity assessments may have different weight in determining the risk score. For example, a first entity assessment may be a larger indicator of the total risk than a second entity assessment, and therefore the first entity assessment may have a greater weight in determining the risk score.

In various embodiments, the results of the simulated entity assessment(s) may be only a portion of the determination of the risk score. For example, the simulated entity assessment(s) may be a first percentage of the risk score determination and other factors may be considered for the remaining determination. Other factors may include entity type (e.g., industry of entity), sophistication of entity (e.g., type of data being stored), experience and/or expertise of entity (e.g., does the entity have users that understand cybersecurity), entity activity (e.g., the system may monitor the actions of the entity to detect risker behavior), and/or the like. In various embodiments, the risk score may be determined using multiple different factors (e.g., entity assessment(s) and/or other factors) to determine a risk score.

Referring now to optional Block 1170 of FIG. 11, the method includes generating a rendering of a portal with the entity assessment determination for one or more of the one or more entity assessments. The results of the entity assessments (e.g., the entity assessment determination and/or additional information) may be rendered to a user interface associated with the account.

In various embodiments, the portal may include any of the information shown on the user interfaces of FIGS. 6-10. For example, the portal may include the entity assessment determination for each of the one or more entity assessments, risk scores for the entire account and/or categories, recommended account changes, and/or the like.

In various embodiments, the portal may render information relating to sub-assessments within a category (e.g., multiple entity assessments may be combined for a given category and receive a singular entity assessment determination for the given category). Additionally or alternatively, each individual check (e.g., entity assessment may receive an entity assessment determination (e.g., pass or fail) and the individual entity assessment determinations may be used to determine a risk score for the entire category and/or account. Further, the risk score may accept a multitiude of other parameters, including parameters based on compliance checks, security checks, vulnerability checks, or custom checks such as checks for organizations and known government threat actors.

Referring now to FIG. 12, a flowchart 1200 is provided illustrating a method of providing recommended account changes in accordance with various embodiments. The method discussed herein may be carried out by one or more of the components discussed in reference to FIG. 1. For example, the method may be carried out by the assessment generation system 175 (e.g., the assessment determination server 157, the portal server 151, etc.) and/or the client computing device(s) 152. The operations of the method may be carried out by a system as discussed herein. Additionally, a computer program product may include executable portion(s) that are configured to carry out the method herein. Additionally, unless otherwise stated, the operations of FIGS. 11 and 12 may be carried out by the same system, such as the systems of various embodiments discussed herein.

Referring now to optional Block 1210 of FIG. 12, the method includes determining one or more account changes in order to improve a result for at least one of the one or more entity assessment. The account change(s) may also be referred to as recommended action(s) herein. The account change(s) may be any changes to the account that would improve the operation of the account. Example account changes may include network setting changes, installing anti-virus software, contacting an expert, subscribing to real-time testing services, and/or the like. The account change(s) may be automatically implemented (e.g., if a user selects to install an anti-virus, the anti-virus software may be automatically installed) and/or manual (e.g., an expert may be contacted to review the account and provide recommendations.

In various embodiments, one or more account changes may be determined via an artificial intelligence engine based on the account. For example, the AI engine may compare the account to similarly situated accounts to determine any changes needed. Additionally or alternatively, the AI engine may compare the account settings and operations to a predetermined recommended settings or operations (e.g., a predetermined standard).

Referring now to optional Block 1220 of FIG. 12, the method includes causing a rendering of a representation for each of the one or more account changes to a user interface. As shown in FIGS. 8 and 10, the account changes may be rendered to a user interface (e.g., of a computing device(s) 152). The representation of each account change may include information relating to the given account change. The representation of each account change may be ordered based on priority (e.g., a first account change may have a higher positive effect on the risk score than a second account change, and as such, the first account change may be displayed before the second account change). In various embodiments, each of the one or more account changes are engageable by a user associated with the account. For example, a user may click or otherwise engage with one of the account changes to begin implementing the given account change.

Referring now to optional Block 1230 of FIG. 12, the method includes causing one of the one or more account changes to be implemented in response to an engagement of one of the representation for each of the one or more account changes by the user associated with account. As discussed above, a user associated with the given account may engage with a given account change and the system may implement the given account change. For automatic account changes (e.g., installing anti-virus software), the system may automatically install the necessary software and/or automatically change the account settings. For manual account changes (e.g., contact an expert), the system may begin the process of implementation (e.g., contacting an expert to review the account).

In various embodiments, the method of FIG. 11 and/or FIG. 12 may be carried out by a system including at least one non-transitory storage device and at least one processing device coupled to the at least one non-transitory storage device. In such an embodiment, the at least one processing device is configured to carry out the method of FIG. 11 and/or FIG. 12. Additionally, a computer program product may be provided to carry out the method of FIG. 11 and/or FIG. 12 upon execution. The computer program product of an example embodiment includes at least one non-transitory computer-readable medium having one or more computer-readable program code portions embodied therein. In such an embodiment, the one or more computer-readable program code portions include at least one executable portion configured to carry out the method of FIG. 11 and/or FIG. 12.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

III. Claim Clauses

Clause 1. A method for dynamically determining assessment results, the method comprising: determining one or more entity assessments to be completed for an account, wherein the one or more entity assessments are related to at least one of security or compliance for the account; receiving one or more security data packets used to simulate each of the one or more entity assessments, wherein the one or more security data packets are received from a security database; receiving one or more compliance data packets used to simulate each of the one or more entity assessments, wherein the one or more compliance data packets are received from a compliance database, wherein the one or more compliance data packets comprises user provided information; determining an entity assessment determination for each of the one or more entity assessments, wherein the entity assessment determination indicates whether the account would pass or fail a given entity assessment of the one or more entity assessments; and determining a risk score for the account based on the entity assessment determination for each of the one or more entity assessments.

Clause 2. The method of Clause 1, further comprising causing a simulation of each of the one or more entity assessments based on the one or more security data packets and one or more compliance data packets.

Clause 3. The method of Clause 1, further comprising causing a rendering of the entity assessment determination for each of the one or more entity assessments.

Clause 4. The method of Clause 1, further comprising generating a rendering of a portal with the entity assessment determination for one or more of the one or more entity assessments.

Clause 5. The method of Clause 4, wherein at least one of the entity assessment determination for one or more of the one or more entity assessments comprises a plurality of sub-assessments, wherein each of the plurality of sub-assessments comprise an entity sub-assessment determination.

Clause 6. The method of Clause 1, wherein the determination of the one or more entity assessments to be completed for an account is based on the account.

Clause 7. The method of Clause 1, further comprising determining one or more account changes in order to improve a result for at least one of the one or more entity assessments.

Clause 8. The method of Clause 7, further comprising causing a rendering of a representation for each of the one or more account changes to a user interface, wherein each of the one or more account changes are engageable by a user associated with the account.

Clause 9. The method of Clause 8, further comprising causing one of the one or more account changes to be implemented in response to an engagement of one of the representation for each of the one or more account changes by the user associated with account.

Clause 10. The method of Clause 7, wherein the one or more account changes are determined via an artificial intelligence engine based on the account.

Clause 11. A system for dynamically determining assessment results, the system comprising: at least one non-transitory storage device; and at least one processing device coupled to the at least one non-transitory storage device, wherein the at least one processing device is configured to: determine one or more entity assessments to be completed for an account, wherein the one or more entity assessments are related to at least one of security or compliance for the account; receive one or more security data packets used to simulate each of the one or more entity assessments, wherein the one or more security data packets are received from a security database; receive one or more compliance data packets used to simulate each of the one or more entity assessments, wherein the one or more compliance data packets are received from a compliance database, wherein the one or more compliance data packets comprises user provided information; determine an entity assessment determination for each of the one or more entity assessments, wherein the entity assessment determination indicates whether the account would pass or fail a given entity assessment of the one or more entity assessments; and determine a risk score for the account based on the entity assessment determination for each of the one or more entity assessments.

Clause 12. The system of Clause 11, wherein the at least one processing device is further configured to cause a simulation of each of the one or more entity assessments based on the one or more security data packets and one or more compliance data packets.

Clause 13. The system of Clause 11, wherein the at least one processing device is further configured to cause a rendering of the entity assessment determination for each of the one or more entity assessments.

Clause 14. The system of Clause 11, wherein the at least one processing device is further configured to generate a rendering of a portal with the entity assessment determination for one or more of the one or more entity assessments.

Clause 15. The system of Clause 14, wherein at least one of the entity assessment determination for one or more of the one or more entity assessments comprises a plurality of sub-assessments, wherein each of the plurality of sub-assessments comprise an entity sub-assessment determination.

Clause 16. The system of Clause 11, wherein the determination of the one or more entity assessments to be completed for an account is based on the account.

Clause 17. The system of Clause 11, wherein the at least one processing device is further configured to determine one or more account changes in order to improve a result for at least one of the one or more entity assessments.

Clause 18. The system of Clause 17, wherein the at least one processing device is further configured to cause a rendering of a representation for each of the one or more account changes to a user interface, wherein each of the one or more account changes are engageable by a user associated with the account.

Clause 19. The system of Clause 18, wherein the at least one processing device is further configured to cause one of the one or more account changes to be implemented in response to an engagement of one of the representation for each of the one or more account changes by the user associated with account.

Clause 20. The system of Clause 17, wherein the one or more account changes are determined via an artificial intelligence engine based on the account.

Clause 21. A computer program product for dynamically determining assessment results, the computer program product comprising at least one non-transitory computer-readable medium having one or more computer-readable program code portions embodied therein, the one or more computer-readable program code portions comprising at least one executable portion configured to: determine one or more entity assessments to be completed for an account, wherein the one or more entity assessments are related to at least one of security or compliance for the account; receive one or more security data packets used to simulate each of the one or more entity assessments, wherein the one or more security data packets are received from a security database; receive one or more compliance data packets used to simulate each of the one or more entity assessments, wherein the one or more compliance data packets are received from a compliance database, wherein the one or more compliance data packets comprises user provided information; determine an entity assessment determination for each of the one or more entity assessments, wherein the entity assessment determination indicates whether the account would pass or fail a given entity assessment of the one or more entity assessments; and determine a risk score for the account based on the entity assessment determination for each of the one or more entity assessments.

Clause 22. The computer program product of Clause 21, wherein the one or more computer-readable program code portions comprise at least one executable portion further configured to cause a simulation of each of the one or more entity assessments based on the one or more security data packets and one or more compliance data packets.

Clause 23. The computer program product of Clause 21, wherein the one or more computer-readable program code portions comprise at least one executable portion further configured to cause a rendering of the entity assessment determination for each of the one or more entity assessments.

Clause 24. The computer program product of Clause 21, wherein the one or more computer-readable program code portions comprise at least one executable portion further configured to generate a rendering of a portal with the entity assessment determination for one or more of the one or more entity assessments.

Clause 25. The computer program product of Clause 24, wherein at least one of the entity assessment determination for one or more of the one or more entity assessments comprises a plurality of sub-assessments, wherein each of the plurality of sub-assessments comprise an entity sub-assessment determination.

Clause 26. The computer program product of Clause 21, wherein the determination of the one or more entity assessments to be completed for an account is based on the account.

Clause 27. The computer program product of Clause 21, wherein the one or more computer-readable program code portions comprise at least one executable portion further configured to determine one or more account changes in order to improve a result for at least one of the one or more entity assessments.

Clause 28. The computer program product of Clause 27, wherein the one or more computer-readable program code portions comprise at least one executable portion further configured to cause a rendering of a representation for each of the one or more account changes to a user interface, wherein each of the one or more account changes are engageable by a user associated with the account.

Clause 29. The computer program product of Clause 28, wherein the one or more computer-readable program code portions comprise at least one executable portion further configured to cause one of the one or more account changes to be implemented in response to an engagement of one of the representation for each of the one or more account changes by the user associated with account.

Clause 30. The computer program product of Clause 27, wherein the one or more account changes are determined via an artificial intelligence engine based on the account.

There, the following is claimed:

1. A method for dynamically determining assessment results, the method comprising:
   determining one or more entity assessments to be completed for an account, wherein the one or more entity assessments are related to at least one of security or compliance for the account;
   receiving one or more security data packets used to simulate each of the one or more entity assessments, wherein the one or more security data packets are received from a security database, wherein the one or more security data packets is formatted as security data;
   receiving one or more compliance data packets used to simulate each of the one or more entity assessments, wherein the one or more compliance data packets are received from a compliance database, wherein the one or more compliance data packets comprises user provided information, wherein the one or more compliance data packets is formatted as compliance data, wherein the formatting of the compliance data is different from the formatting of the security data;

reformatting at least one of the one or more security data packets or the one or more compliance data packets based on at least one commonality between the one or more security data packets and the one or more compliance data packets, wherein the reformatting allows for the one or more security data packets to be analyzed with the one or more compliance data packets based on the at least one commonality between the one or more compliance data packets and the one or more security data packets;

determining an entity assessment determination for each of the one or more entity assessments, wherein the entity assessment determination indicates whether the account would pass or fail a given entity assessment of the one or more entity assessments; and determining a risk score for the account based on the entity assessment determination for each of the one or more entity assessments.

2. The method of claim 1, further comprising causing a simulation of each of the one or more entity assessments based on the one or more security data packets and one or more compliance data packets.

3. The method of claim 1, further comprising causing a rendering of the entity assessment determination for each of the one or more entity assessments.

4. The method of claim 1, further comprising generating a rendering of a portal with the entity assessment determination for one or more of the one or more entity assessments.

5. The method of claim 1, further comprising determining one or more account changes in order to improve a result for at least one of the one or more entity assessments.

6. The method of claim 5, further comprising causing a rendering of a representation for each of the one or more account changes to a user interface, wherein each of the one or more account changes are engageable by a user associated with the account.

7. The method of claim 6, further comprising causing one of the one or more account changes to be implemented in response to an engagement of one of the representation for each of the one or more account changes by the user associated with account.

8. The method of claim 1, wherein reformatting at least one of the one or more security data packets or the one or more compliance data packets based on the at least one commonality between the one or more security data packets and the one or more compliance data packets comprises normalizing the security data and the compliance data using common shared titles for columns, wherein the at least one commonality is common column titles for each of the one or more security data packets and the one or more compliance data packets.

9. A system for dynamically determining assessment results, the system comprising:

at least one non-transitory storage device; and at least one processing device coupled to the at least one non-transitory storage device, wherein the at least one processing device is configured to:

determine one or more entity assessments to be completed for an account, wherein the one or more entity assessments are related to at least one of security or compliance for the account;

receive one or more security data packets used to simulate each of the one or more entity assessments, wherein the one or more security data packets are received from a security database, wherein the one or more security data packets is formatted as security data;

receive one or more compliance data packets used to simulate each of the one or more entity assessments, wherein the one or more compliance data packets are received from a compliance database, wherein the one or more compliance data packets comprises user provided information, wherein the one or more compliance data packets is formatted as compliance data, wherein the formatting of the compliance data is different from the formatting of the security data;

reformat at least one of the one or more security data packets or the one or more compliance data packets based on at least one commonality between the one or more security data packets and the one or more compliance data packets, wherein the reformatting allows for the one or more security data packets to be analyzed with the one or more compliance data packets based on the at least one commonality between the one or more compliance data packets and the one or more security data packets;

determine an entity assessment determination for each of the one or more entity assessments, wherein the entity assessment determination indicates whether the account would pass or fail a given entity assessment of the one or more entity assessments; and determine a risk score for the account based on the entity assessment determination for each of the one or more entity assessments.

10. The system of claim 9, wherein the at least one processing device is further configured to cause a simulation of each of the one or more entity assessments based on the one or more security data packets and one or more compliance data packets.

11. The system of claim 9, wherein the at least one processing device is further configured to cause a rendering of the entity assessment determination for each of the one or more entity assessments.

12. The system of claim 9, wherein the at least one processing device is further configured to determine one or more account changes in order to improve a result for at least one of the one or more entity assessments.

13. The system of claim 12, wherein the at least one processing device is further configured to cause a rendering of a representation for each of the one or more account changes to a user interface, wherein each of the one or more account changes are engageable by a user associated with the account.

14. The system of claim 9, wherein reformatting at least one of the one or more security data packets or the one or more compliance data packets based on the at least one commonality between the one or more security data packets and the one or more compliance data packets comprises normalizing the security data and the compliance data using common shared titles for columns, wherein the at least one commonality is common column titles for each of the one or more security data packets and the one or more compliance data packets.

15. A computer program product for dynamically determining assessment results, the computer program product comprising at least one non-transitory computer-readable medium having one or more computer-readable program code portions embodied therein, the one or more computer-readable program code portions comprising at least one executable portion configured to:

determine one or more entity assessments to be completed for an account, wherein the one or more entity assessments are related to at least one of security or compliance for the account;

receive one or more security data packets used to simulate each of the one or more entity assessments, wherein the one or more security data packets are received from a security database, wherein the one or more security data packets is formatted as security data;

receive one or more compliance data packets used to simulate each of the one or more entity assessments, wherein the one or more compliance data packets are received from a compliance database, wherein the one or more compliance data packets comprises user provided information, wherein the one or more compliance data packets is formatted as compliance data, wherein the formatting of the compliance data is different from the formatting of the security data;

reformat at least one of the one or more security data packets or the one or more compliance data packets based on at least one commonality between the one or more security data packets and the one or more compliance data packets, wherein the reformatting allows for the one or more security data packets to be analyzed with the one or more compliance data packets based on the at least one commonality between the one or more compliance data packets and the one or more security data packets;

determine an entity assessment determination for each of the one or more entity assessments, wherein the entity assessment determination indicates whether the account would pass or fail a given entity assessment of the one or more entity assessments; and determine a risk score for the account based on the entity assessment determination for each of the one or more entity assessments.

16. The computer program product of claim 15, wherein the one or more computer-readable program code portions comprise at least one executable portion further configured to cause a simulation of each of the one or more entity assessments based on the one or more security data packets and one or more compliance data packets.

17. The computer program product of claim 15, wherein the one or more computer-readable program code portions comprise at least one executable portion further configured to cause a rendering of the entity assessment determination for each of the one or more entity assessments.

18. The computer program product of claim 15, wherein the one or more computer-readable program code portions comprise at least one executable portion further configured to generate a rendering of a portal with the entity assessment determination for one or more of the one or more entity assessments.

19. The computer program product of claim 15, wherein the one or more computer-readable program code portions comprise at least one executable portion further configured to determine one or more account changes in order to improve a result for at least one of the one or more entity assessments.

20. The computer program product of claim 15, wherein reformatting at least one of the one or more security data packets or the one or more compliance data packets based on the commonality between the one or more security data packets and the one or more compliance data packets comprises normalizing the security data and the compliance data using common shared titles for columns, wherein the at least one commonality is common column titles for each of the one or more security data packets and the one or more compliance data packets.

* * * * *